US008756185B2

(12) United States Patent
Dawson et al.

(10) Patent No.: US 8,756,185 B2
(45) Date of Patent: Jun. 17, 2014

(54) GENERATING A DOCUMENT REPRESENTATION USING SEMANTIC NETWORKS

(71) Applicant: Tagged, Inc., San Francisco, CA (US)

(72) Inventors: Karl Dawson, North Vancouver (CA); Jaromir Dzialo, Cracow (PL); Agata Niewiadomska, Cracow (PL); Piotr Metel, Wieliczka (PL); Marek Grochowski, Cracow (PL)

(73) Assignee: Tagged, Inc., San Francisco, CA (US)

( * ) Notice: Subject to any disclaimer, the term of this patent is extended or adjusted under 35 U.S.C. 154(b) by 0 days.

(21) Appl. No.: 13/714,937

(22) Filed: Dec. 14, 2012

(65) Prior Publication Data

US 2014/0019385 A1    Jan. 16, 2014

Related U.S. Application Data

(63) Continuation of application No. 12/718,692, filed on Mar. 5, 2010, now Pat. No. 8,335,754.

(60) Provisional application No. 61/158,173, filed on Mar. 6, 2009.

(51) Int. Cl.
  *G06F 17/00* (2006.01)
  *G06N 5/00* (2006.01)
(52) U.S. Cl.
  USPC .......................................................... 706/45
(58) Field of Classification Search
  None
  See application file for complete search history.

(56) References Cited

U.S. PATENT DOCUMENTS

| 6,263,335 | B1 | 7/2001 | Paik et al. |
| 2003/0212543 | A1 | 11/2003 | Epstein et al. |
| 2005/0177385 | A1 | 8/2005 | Hull et al. |
| 2005/0182765 | A1* | 8/2005 | Liddy .............................. 707/5 |
| 2005/0198031 | A1 | 9/2005 | Pezaris et al. |
| 2006/0129906 | A1* | 6/2006 | Wall .............................. 715/500 |

(Continued)

FOREIGN PATENT DOCUMENTS

| JP | 2008-146246 A | 6/2008 |
| JP | 2009-288995 A | 12/2009 |

(Continued)

OTHER PUBLICATIONS

U.S. Appl. No. 13/833,243, of Schleir-Smith, J., et al., filed Mar. 15, 2013.

(Continued)

*Primary Examiner* — Li-Wu Chang
(74) *Attorney, Agent, or Firm* — Perkins Coie LLP

(57) ABSTRACT

A method, system and computer program product for developing a semantic network are disclosed. The system includes a server and a client computer, and the method involves: creating a semantic network containing at least one root concept; performing a set of instructions associated with the semantic network, the set of instructions comprising: transmitting information about the semantic network from the client computer to a server; providing information about at least one resource to the server, the at least one resource containing concepts and relations associated with the at least one root concept; receiving information about a modified semantic network from the server; presenting the information about the modified semantic network to a user; receiving a response from the user; based on the response, further modifying the semantic network. The system interactively modifies semantic networks in response to user feedback, and produces personal semantic networks and document use histories.

33 Claims, 25 Drawing Sheets

(56) References Cited

U.S. PATENT DOCUMENTS

| | | | |
|---|---|---|---|
| 2007/0192299 A1 | 8/2007 | Zuckerberg et al. | |
| 2007/0219933 A1 | 9/2007 | Datig | |
| 2008/0097974 A1 | 4/2008 | Chen et al. | |
| 2008/0133213 A1 | 6/2008 | Pollara | |
| 2008/0140650 A1 | 6/2008 | Stackpole | |
| 2009/0164387 A1* | 6/2009 | Armstrong et al. | 705/36 R |
| 2009/0287674 A1* | 11/2009 | Bouillet et al. | 707/5 |
| 2009/0327437 A1 | 12/2009 | Estrada | |
| 2010/0257454 A1 | 10/2010 | Lee et al. | |
| 2012/0082401 A1 | 4/2012 | Berger et al. | |
| 2012/0096037 A1 | 4/2012 | Sittig et al. | |
| 2012/0110429 A1 | 5/2012 | Tzonis et al. | |

FOREIGN PATENT DOCUMENTS

| | | |
|---|---|---|
| JP | 2012-003635 A | 1/2012 |
| KR | 2010-0130003 A | 12/2010 |
| KR | 2012-0035606 A | 4/2012 |

OTHER PUBLICATIONS

U.S. Appl. No. 13/833,274 of Schleir-Smith, J., et al., filed Mar. 15, 2013.

U.S. Patent Application No. 13/833,406, of Schleir-Smith, J., et al., filed Mar. 15, 2013.

U.S. Appl. No. 12/718,692 of Dawson, K., et al., filed May 5, 2010, issued as U.S. Patent No. 8,335,754 on Dec. 18, 2012.

International Search Report and Written Opinion mailed Aug. 19, 2013, for International Patent Application No. PCT/US13/41663 filed May 17, 2013.

International Search Report and Written Opinion mailed Aug. 19, 2013 for International Patent Application No. PCT/US13/41684 filed filed May 17, 2013.

International Search Report and Written Opinion mailed Aug. 19, 2013 for International Patent Application No. PCT/US13/41690 filed May 17, 2013.

Banko, Michele et al.: "Open Information Extraction from the Web", International Joint Conference on Artificial Intelligence Proceedings 2007; pp. 2670-2676; 2007.

Dichev, Christo and Dicheva, Darina, "View-Based Semantic Search and Browsing"; p. 7 Proceedings of the 2006 IEEEI WIC/ACM International Conference on Web Intelligence; 2006.

Farzindar, Atefeh, Lapalme, Guy and Saggion, Horacio; Summaries with SumUM and its Expansion for Document Understanding Conference (DUC 2002); Workshop on Text Summarization; 2002.

Gelfand, Boris, Wulfekuhler, Marilyn and Punch, William F. III; "Automated Concept Extraction From Plain 25 Text", MAI Technical Report WS-98-05; pp. 13-17; Association for the Advancement of Artificial Intelligence (AMI), USA; 1998.

Hammond, Brian, Sheth, Amit and Kochut, Krzysztof; "Semantic Enhancement Engine: A Modular Document Enhancement Platform for Semantic Applications over Heterogeneous Content"; Real World Semantic Web Applications; pp. 29-49; IOS Press; 2002.

Leake, David B. et al.; "Aiding Knowledge Capture by Searching for Extensions of Knowledge Models"; Second International Conference on Knowledge Capture; KoCAP'03, Oct. 23-25, 2003, Sanibel Island, Florida, USA; 2003. pp. 44-53.

Leake, David B., Maguitman, Ana and Reich Herzer, Thomas; "Topic Extraction and Extension to Support Concept Mapping"; Proceedings of FLAIRS-03; AAAI Press, Saint Augustine, FL, USA; 2003. p. 5.

Leskovec, Jure, Groselnik, Marko and MILIC-FRAYLING, Natasa; "Learning Semantic Sub-graphs for Document Summarization"; Proceedings of the 7th International Multi-Conference Information Society IS 2004; vol. B; 2004. pp. 8.

Leuski, Anton, Lin, Chin-Yew and Hovy, Eduard; "iNeATS: Interactive Multi-Document Summarization"; Proceedings of the 41st Annual Meeting on Association for Computational Linguistics; pp. 125-128; vol. 2; Association for Computational Linguistics Morristown, NJ, USA; 2003.

Maisonnasse, Loic, Gaussier, Eric & Chevallet, Jean-Pierre; "Multi-Relation Modeling on Multi Concept Extraction"; Cross Language Evaluation Forum 2008; Working Notes for the CLEF 2008 Workshop, Denmark; 2008. pp. 8.

Merlo, Paola et al.; "Learning Document Similarity Using Natural Language Processing"; Linguistik Online; 17, May 2003; Europa-Universitat Viadrina in Frankfurt et al.; 2003, pp. 17.

Nazar, Rogelio, Vivaldi, Jorge and Wanner, Leo; "Towards Quantitative Concept Analysis"; Procesamiento del Lenguaje Natural; pp. 139-146; n039; Sociedad Espanola para el Procesamiento del Lenguaje Natural, Spain; 2007.

Poibeau, Thierry, Arcouteil, Alexandre and Grouin, Cyril; "Recycling an Information Extraction system to automaticallyroduce Semantic Annotations for the Web"; Proceedings of the ECAI 2002 Workshop on Semantic Authoring, Annotation & Knowledge Markup; 2002, pp. 5.

Rajaraman, Kanagasabai and Tan Ah-Hwee; "Knowledge Discovery from Texts: A Concept Frame Graph Approach"; Proceedings of the Eleventh International Conference on Information Knowledge Management; pp. 669-671; ACM, New York, NY, USA; 2002.

Reichherzer, Thomas and Leake, David; "Towards Automatic Support for Augmenting Concept Maps withDocuments"; 2nd International Conference on Concept Mapping; 2006, pp. 8.

Rusu, D. et al.; "Semantic Graphs Derived From Triplets with Application in Document Summarization"; Proceedings 23 of the 11th International Multiconference "Information Society-IS 2008"; pp. 198-201; 2008.

Saggion, Horacio and Lapalme, Guy; "Concept Identification and Presentation in the Context of Technical Text Summarization"; Proceedings of the Workshop on Automatic Summarization; pp. 1-10; Association for Computational Linguistics Morristown, NJ, USA; 2000.

Tifi, Alfredo and Lombardi, Antonietta; "Collaborative Concept Mapping Models"; Proc. of the Third Inl. Conference on Concept Mapping; 2008, pp. 8.

Valerio, Alejandro, Leake, David Canas, Alberto J.; "Associating Documents to Concept Maps in Context"; Proc. of the Third Inl. Conference on Concept Mapping; Tallinn, Estonia & Helsinki, Finland; 2008, pp. 8.

Valerio, Alejandro and Leake, Davie; "Jump-Starting Concept Map Construction with Knowledge Extracted From Documents"; Proc. of the Second Inl. Conference on Concept Mapping; San Jose, Costa Rica; 2006.

Valerio, Alejandro, Leake, David andCanas, Alberto J.; "Automatically Associating Documents withConcept Map Knowledge Models"; 33rd Latin American Conference in Informatics (CLEI 07); 2007, pp. 9.

Vallet, David et al.; "A contextual personalization approace based on ontological knowledge"; 17th European Conference onArtifical Intelligence (ECAI 2006); 2006, pp. 5.

Wafula; Belinda Ng'asia; "Automatic Construction of Concept Maps"; <online: http//www.cs.joensuu.fi/pages/whamalai/sciwri/belinda.pdf>; 2006.

Zhang, Haigin et al.; "A Study for Documents Summarization based on Personal Annotation"; Prooceedings of the HL T-NAACL 03; pp. 41-48; vol. 5; Association for Computational Linguistics Morristown, NJ, USA; 2003.

Zouaq, Arnal, Nkambou, Roger and Frasson, Claude; "Document Semantic Annotation for Intelligent Tutoring Systems: a Concept Mapping Approach"; FLAIRS 2007 Proceedings; 2007, pp. 6.

\* cited by examiner

Nash was not like Einstein. Disadvantaged by poor formal instruction, he could do mathematics but could not manage quantum physics. Their meetings at Princeton were few and short.
401

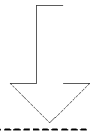

```
(ROOT(S (S (VP (VBN disadvantaged)
            (PP (IN by)
                (NP (JJ poor)
                    (JJ formal)
                    (NN instruction)))))
        (. ,)
        (NP (PRP he))
        (VP (VP (MD could)
                (VP (VB do)
                    (NP (NNS mathematics))))
            (CC but)
            (VP (MD could)
                (RB not)
                (VP (VB manage)
                    (NP (NN quantum)
                        (NNS physics)))))
        (. .)))
```
402

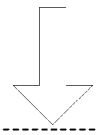

```
phi.cof.ga.parse.impl.SimpleClause@14b6b02
subject: NP PRP he
verb: VP VBN disadvantaged
object: PP IN by NP JJ poor JJ formal NN instruction phi.cof.ga.parse.impl.SimpleClause@5e8d7d
subject: NP PRP he
verb: VP MD could VP VB do
object: NP NNS mathematics phi.cof.ga.parse.impl.SimpleClause@19b4748
subject: NP PRP he
verb: VP MD could RB not VP VB manage
object: NP NN quantum NNS physics
```
403

My Browser

File | Edit | View | Tools | Topicmarks | Help http://www.webencycloscience.com/sfr

Topicmark: special relativity

- special relativity
  - is
    - a physical theory
  - incorporates
    - the principle that the s...
      - is
        - the same for...

Relevance: 100%  I like it!

THE WEB ENCYCLOPEDIA OF SCIENCE

*Special relativity*

Special relativity (also known as the special theory of relativity) is a physical theory proposed in 1905 by Albert Einstein in the paper "On the Electrodynamics of Moving Bodies". It generalizes Galileo's principle of relativity -- that all uniform motion is relative, and that there is no absolute and well-defined state of rest (no privileged reference frames) -- from mechanics to all the laws of physics, including both the laws of mechanics and of electrodynamics. Special relativity incorporates the principle that the speed of light is the same for all inertial observers regardless of the state of motion of the source.

This theory has a wide range of consequences which have been experimentally verified, including counter-intuitive ones such as length contraction, time dilation and relativity of simultaneity, contradicting the classical notion that the duration of the time interval between two events is equal for all observers. Combined with other laws of physics, the two postulates of special relativity predict the equivalence of matter and energy, as expressed in the mass-energy equivalence formula $E=mc^2$. The predictions of special relativity agree well with Newtonian mechanics in their common realm of applicability, specifically in experiments in which all velocities are small compared to the speed of light.

The theory is termed "special" because it applies the principle of relativity only to frames in uniform relative motion. Later on, Einstein developed general relativity to apply the principle more generally, that is, to any frame so as to handle general Done

| Facts | Summary | Keywords | Index | Notes |

Search: [Solar System ×] documents ←588           Show [5 ▷] entries

Fact No. ◇ | Subject | ◇ Verb | ◇ Object | weight ▽
---|---|---|---|---
1 | Saturn | is | the second largest planet in the Solar System, after Jupiter | 7
25 | Saturn | is | the only planet of the Solar System that is less dense than water | 7
| | | ...mbination of its lower density, rapid rotation, and fluid state. Saturn is an oblate spheroid; that is, it is flattened at the poles and bulges at the equator. Its equatorial and polar radii differ by almost 10% - 60,268 km vs. 54,364 km. The other gas planets are also oblate, but to a lesser extent. Saturn is the only planet of the Solar System that is less dense than water. Although Saturn's core is considerably denser than water, the average specific density of the planet is 0.69 g/cm³ due to the gaseous atmosphere. Saturn is only 95 Earth masses, compared to Jupiter, which is 318 times the mass of the Earth but only about 20% larger than Saturn. Though there is n... go to fact >> | 
55 | Saturn's winds | are | among the Solar System's fastest | 6
124 | Saturn | is | probably best known for its system of planetary rings, which makes it the most visually remarkable object in the solar system | 6
176 | research on Titan | led | to the confirmation in 1944 that it had a thick atmosphere – a feature unique among the solar system's moons | 3

Showing 1 to 5 of 10 entries (filtered from 264 total entries)      First << [1] 2 >> Last

*FIG. 20*

| Facts | Summary | Keywords | Index | Notes |

Search: [Cassini probe] [x] [OK] ☐ strict    documents  Sentences: [10]
         ↑572              ↑582      ↑588              ↑584

570 →    580 ↓    536 ↓

While approaching Saturn in 2004, the <u>Cassini spacecraft</u> found that the <u>radio rotation period</u> of Saturn had increased appreciably, to approximately 10h 45m 45 s (± 36 s). The latest estimate of Saturn's rotation based on a compilation of various measurements from the Cassini, Voyager and Pioneer probes was reported in <u>September 2007</u> as 10 hours, 32 minutes, 35 seconds. In the 21st century observations continue from the earth (or earth orbiting observatories), and also from the Cassini orbiter at Saturn. In 1675, Cassini also discovered the gap now known as the <u>Cassini Division</u>. In November 1980, the <u>Voyager 1 probe</u> visited the Saturn system.

Cassini's flyby of Saturn's largest moon, Titan, has captured radar <u>images</u> of large lakes and their coastlines with numerous islands and mountains. Since early 2005, scientists have been tracking lightning on Saturn, primarily found by Cassini. On March 10, 2006, NASA reported that, through images, the <u>Cassini probe</u> found evidence of <u>liquid water reservoirs</u> that erupt in geysers on Saturn's moon <u>Enceladus</u>. On September 20, 2006, a <u>Cassini probe</u> photograph revealed a previously undiscovered <u>planetary ring</u>, outside the brighter main rings of Saturn and inside the G and E rings. In October 2006, the probe detected a <u>8,000 km diameter hurricane</u> with an eyewall at Saturn's <u>South Pole</u>.

*FIG. 21*

| Facts | Summary | Keywords | Index | Notes |

THE WEB ENCYCLOPEDIA OF SCIENCE

*Saturn*

Saturn is the sixth planet from the Sun, Jupiter. Saturn, along with Jupiter, these four planets are sometimes Saturn is named after the Roman Zeus) the Babylonian Ninurta and Sickle (Unicode: ♄).

| General Info | Comment | Facts | Keywords |

Title: Saturn – WEB ENCYCLOPEDIA OF SCIENCE
URL: www.webencycloscience.com/chapter/Saturn
Weight: 5
Source: USER
MIME type: text/html
Date: 2/7/2010 10:12pm

[ Save ]  cancel

The planet Saturn is composed of elements. [12] The interior consists of metallic hydrogen and a gaseous appearance, although long-lived 1,800 km/h, significantly faster than immediate in strength between the Saturn has a prominent system of of rocky debris and dust. Sixty of "moonlets" within the rings. Titan, Saturn's largest and the Solar System's second largest moon (after Jupiter's Ganymede), is larger than the planet Mercury and is the only moon in the Solar System to possess a significant atmosphere.

Contents
   1. Physical characteristics
      1.1. Internal structure
   2. Atmosphere

*FIG. 24*

GENERATING A DOCUMENT REPRESENTATION USING SEMANTIC NETWORKS

CROSS-REFERENCE TO RELATED APPLICATIONS

This application is a continuation application of U.S. patent application Ser. No. 12/718,692, filed Mar. 5, 2010, entitled "REPRESENTING A DOCUMENT USING A SEMANTIC STRUCTURE" which claims priority of provisional application 61/158,173, filed Mar. 6, 2009, the entire contents of which are hereby incorporated by reference.

BACKGROUND OF THE INVENTION

1. Field of Invention

The present invention relates to a post-Gutenberg reading experience and, in particular, to a method of generating a document representation, to a related computer program product and to a related system.

2. Description of Related Art a. Introduction

The World Wide Web is having a profound impact on humankind. Because information in many forms from many sources is made instantaneously available around the world to anybody with an internet connection, our perceptions of space, time and knowledge are changing. The internet, as we all concede now, has profoundly changed the functioning of human societies across the world. At the center of this change is the democratization and globalization of information by way of electronic documents. In this regard, the internet of the mid-1990s is likened to the Gutenberg printing press of the Renaissance—a profound catalyst in the development of human thought and knowledge.

And the Web continues to evolve, from a strict separation of information producers and consumers that communicate with each other using simple wire and message protocols (HTTP/HTML) to communities of information prosumers that exchange information using application programming interfaces (APIs) known as Web Services. The current state of affairs, which is sometimes called the "read/write Web" or "Web 2.0", is characterized by the ever-present Web as a platform, data centrism, the use of XML/XML Schema as a standard for data exchange between machines, a plethora of collaboration models (Wikis, Folksonomies) and rich client technologies (AJAX, Microformats, RSS feeds, etc.). It is said that a "collective intelligence" is embedded in the Web, that "the growth of the Internet over the last several decades more closely resembles biological evolution than engineering".

b. "Drowning in Information, Starving for Knowledge"

However, the globalization and democratization of information enabled by the Web poses tremendous challenges for both individual and community. It is not just that the amount of information is overwhelming; it is also unstructured and cacophonous. Without a formalism that a machine can understand and without an assignment of semantics, information cannot be processed by a machine in any meaningful way, leaving Web users "drowning in information, starving for knowledge". The problem of information overload is quite insidious, and forces many people to rely on a remarkably small number of information sources as a coping mechanism.

c. Semantic Web

The goal of the Semantic Web is to enable machine understanding so that information becomes knowledge, that this knowledge is understood by both human and machine and that machines talking to machines enhance the human experience on the Web.

A first and far-reaching step towards the Semantic Web is the Resource Description Framework (RDF), an open standard recommended by the World Wide Web Consortium (W3C) as early as 1999, and revised in 2004. The purpose of RDF is to facilitate knowledge representation and information modeling via directed graphs. The result is that RDF has become an assertion semantic network, a product of artificial intelligence work in the 1980s. As such, RDF is a form of knowledge representation: it allows statements about web resources to be made. Statements take the form of a triple: subject-predicate-object, and every element in a statement references either a Uniform Resource Identifier (URI) or a literal.

RDF, replete with syntax but not semantics, is a necessary but not a sufficient condition for realizing the Semantic Web. Semantics requires the ability to model the real world, to formulate abstractions about entities and their relations. To assist in reaching this goal, the W3C recommended OWL (Web Ontology Language) in 2004. OWL is built upon RDF Schema, which in turn is expressed in RDF. There are three OWL variants: OWL Lite, OWL DL and OWL Full. The three variants provide for increasing expressiveness and commensurately decreasing computational completeness, respectively.

d. Semantic Web Inertia

While the Semantic Web has made great progress in some problem domains (medicine, bio-informatics, life sciences), and remains critical in many ways to data and system integration (grid computing, enterprise application integration), it has yet to obtain wide, popular acceptance. Lack of acceptance stems from the intrinsic difficulties of implementing the Semantic Web. In particular, the formulation and use of knowledge with respect to correctness, coherence and completeness is extremely hard for most people. Some argue that knowledge by nature is neither machine tractable nor fully amenable to deductive logic; that real-world knowledge can never be truly and fully captured; that striving towards correctness and completeness of semantics result in overly complex, poorly understood and ultimately counter-productive systems; that shared views are hard to create and that enforcing shared views does "more to debase semantics than create informative connections".

e. Limitations of Folksonomies

The folksonomies of Web 2.0 are not an answer to the inaccessible formalisms of the Semantic Web. Collaborative tagging or social classification provides metadata, but this metadata has few or no restrictions. So, while it may be true that "tags are causing context to explode", enabling more sophisticated searching, the dearth of rules means lack of structure and organization, sparse semantics, and little or no enablement of the machine's ability to understand.

f. Perspective Change

The crux of the problem distills to this: is there something between folksonomies (tag clouds) and ontologies (formal specifications of conceptualizations) that can help the user, with machine assistance, to function effectively against an overwhelming tide of information on the Web?

Without some sort of formalism, machine interaction is not possible; with too much formalism, human interaction dissipates. One way to decrease the demands of formal knowledge representation is to not insist on sharing knowledge while continuing to share information. Personal knowledge versus shared knowledge on the Web is a more tractable problem.

This change in perspective reduces the criticality but does not obviate the need for formal knowledge representation or the utility of ontologies.

g. Personal Knowledge as Semantic Network

With respect to personal knowledge, an exceedingly simple, elegant and effective way to represent knowledge that is both human and machine understandable is a semantic network. A semantic network is a form of structured data, the data comprising concepts and relations between the concepts, e.g., in the form of concept-relation-concept (CRC) triples. Semantic networks per se (i.e. as a topic of research in the field of linguistics) are well known in the art.

"Semantic nets" were first invented for computers by Richard H. Richens of the Cambridge Language Research Unit in 1956. Concept maps, developed by Joseph D. Novak in the 1970s, attest to the appropriateness of semantic networks to human learning and understanding. John F. Sowa is credited with research on conceptual graphs and semantic networks as formal knowledge representation in the 1980s. On a technical level, RDF and Topic Maps (ISO/IEC 13250) have been public standards for the representation and interchange of knowledge as semantic networks since the late 1990s.

h. Patent Literature

U.S. Pat. No. 6,263,335, entitled "Information Extraction System and Method Using Concept-Relation-Concept (CRC) Triples" discloses an information extraction system that allows users to ask questions about documents in a database, and responds to queries by returning possibly relevant information which is extracted from the documents. In this context, concept-relation-concept triples are built from unstructured text.

US 2008/0133213, entitled "Method and System for Personal Information Extraction and Modeling with Fully Generalized Extraction Contexts", focuses on concept-based extraction and modeling in a way to concisely control both the terms that are being sought, and the context in which they are sought. The underlying principle hinges on the pairings of resource-context (R:C) and extractor-concept (X:K), such that X [extractor] is an algorithm that identifies the instances of K [concept] within C [context] in each resource r in a resource set R.

This has several direct consequences:

(i) The system requires an a priori model to start. A model is an unordered set of concepts, absent the notion of any root or starting concept. The user can manually generate a concept model, but better would be an import of a project with a previously defined model, meaning concepts and their corresponding extractors. At any time, a user can add, remove or modify concepts in a model, thereby creating a model of personal information.

(ii) The relationship between X and K in the underlying principle requires that X have some sort of a priori knowledge of K, in order for X to fulfill its goal of K identification. Managing more than one concept at a time requires that "boolean operations be used on extractors to create extraction patterns".

(iii) The basic modus operandi of the system requires the user to work with concepts in a serial manner when extracting (X) concept (K) relevant information from a corpus of documents (R:C). In order to identify all instances of many concepts at once in a document corpus, the user would be obliged to use a priori knowledge to combine extractors through "boolean operations".

(iv) The primacy of context (C) makes the overall application document (R) centric. This is apparent in the statement that one of the key objectives in the system is the identification of all instances of a concept within a document corpus.

Hence, the document relates to both "a method for annotating a set of documents in a model of information" and "a method of determining a trigger phrase related to the set of documents and defining the set of concepts and corresponding extractors based on the trigger phrase."

In sum, the a priori requirements of this patent application publication US 2008/0133213 and its process of structuring unstructured text into a pre-defined model using a generalized technique, wielded by the user, appear similar in nature to the Message Understanding Conferences (MUC) on information extraction and template completion. This observation remains true for the case when there is no previously defined model and the application produces a suggestion list of noun phrases from the project's corpus of documents using conventional information extraction techniques (lexical parsing, N-gram analysis and the like).

i. Electronic Readers

Although we live in what has been called the "post-Gutenberg era", we have not yet created the tools which allow us to read electronic documents with any more efficiency than their paper counterparts. Indeed, the online reading experience is so inferior to the reading experience of printed material that many people print electronic documents that are more than two or three pages in length.

The problems associated with the online reading experience have spawned an industry of dedicated electronic readers. Most of these readers attempt to emulate the physicality of paper, especially with respect to layout, background lighting, font-size, etc. These readers also have rudimentary searching, annotation and navigation abilities. The latest reading devices exploit multi-media capabilities. Of course, many of these reading features can be implemented by software running on general computing devices. The e-reader, however, is designed to facilitate the human ergonomics of reading a book.

The e-reader emphasis on reading as a material activity is inherently limiting—it aspires to no more than what is achievable by paper. Such an approach remains rooted in a Gutenberg mindset, not at all appropriate in a post-Gutenberg world of information where hundreds if not thousands of relevant electronic documents are accessible with the right search request.

The online reading experience, therefore, is not only subject to form but also substance. It is the volume of information, often contradictory and incomplete, which challenges our conventional reading skills and habits. In effect, the more information that we are exposed to, the less we understand. It is the nature of being human, and not a machine, to have limited working memory and to experience diminishing returns with every new bit of information that we are exposed to.

Presently, there are no adequate post-Gutenberg tools, if any at all. An object of the present invention is to address the above shortcomings. It is an object of the present invention to use semantic networks to represent knowledge, most especially personal experience and knowledge, and that the availability of said knowledge facilitates human-machine collaboration, thereby changing how people interact with text, in whatever form.

SUMMARY

Aspects of the present invention provide an interactive method and system that allows to build a semantic network of personal knowledge from unstructured data.

According to a first aspect of the invention, there is provided a method for developing a semantic network. The method involves:

a. providing a client computer and a server;

b. creating a semantic network comprising at least one root concept at the client computer;

c. transmitting information about the semantic network from the client computer to the server;

d. providing at least one resource to the server;

e. extracting semantic structures from the at least one resource at the server;

f. processing said semantic structures at the server, for determining a measure of their significance for the semantic network;

g. modifying the semantic network at the server, based on the processed semantic structures; and h. transmitting information about the modified semantic network from the server to the client computer.

In this manner, the semantic network provided initially at the client computer is modified (i.e., generally extended) by the server and made available to the user at the client computer, giving the user the opportunity to further work with the thus-modified semantic network.

Preferably, the method will be iterative and interactive. To this end, the method may comprise the following steps being carried out at the client computer:

j. presenting the information about the modified semantic network to a user;

k. receiving a response from the user;

l. based on said response, further modifying said semantic network;

m. receiving instructions from the user on whether to repeat modification of the semantic network;

n. depending on the instructions, repeating steps c to m.

In this manner, the semantic network is developed interactively in an iterative procedure of human-machine communication, the network representing both personal experience and knowledge.

In the method, information (in particular, in the form of semantic structures) is extracted from so-called resources. A resource may comprise any of the following: unstructured data; structured data; and services, brokers and agents.

Data may be available locally or, in a preferred embodiment, via a network. The network may be any wide-area network, including the Internet. Preferably, the data are available in the World Wide Web. The minimum requirement is that the data be accessible to either the client (user) or the server (machine), and preferably accessible to both the client (user) and the server (machine). Unstructured data may encompass any kind of text and/or non-text documents. Structured data may encompass other semantic networks, ontologies etc. Services, brokers and agents provide data from specific sources upon specific requests.

In one embodiment, the step of providing said at least one resource to the server may be executed manually (i.e. on the basis of user input). In this case, this step comprises:

d1. at the client computer, querying a user for said at least one resource;

d2. at the client computer, receiving a response from the user about the at least one resource;

d3. based on said response, transmitting information about the at least one resource from the client computer to the server.

In particular, the step of querying the user for said at least one resource may comprise an automated search, e.g., a search in the World Wide Web by a known search engine (such as the well-known Google™ engine) via the Internet, or any other automated search in any other (limited or open) set of resources via any other wide-area network, to provide suggestions to the user, which may optionally be rated by relevance. The user may then select from these suggestions. In other words, this step may comprise:

d1a. carrying out an automated search in a set of resources available via a wide-area network;

d1b. optionally, rating results of said search for their relevance;

d1c. presenting the user with the (optionally: rated) results; and d1d. querying the user for a selection from the results.

In an alternative embodiment, the user does not need to manually specify any resources, and relevant resources are determined automatically by the server. In other words, the step of providing at least one resource to the server may comprise:

d1'. at the server, automatically determining said at least one resource by analyzing said semantic network; and d2'. accessing said at least one resource by the server.

The step of automatically determining said at least one resource may then comprise:

d1a'. carrying out an automated search in a set of resources available via a wide-area network; and d1b.' receiving results from said automated search at the server.

The set of resources may, e.g., again be all structured and/or unstructured data, services, brokers and agents available in the World Wide Web or a part thereof, and the wide-area network may be the Internet.

It goes without saying that the method may encompass giving the user a choice between manual and automatic resource selection.

In the processing step, the semantic structures extracted from the resources are investigated with respect to their usefulness and relevance for the concepts and relations already available in the semantic network. This processing step may comprise one or multiple queries to any internal or external knowledge source. In particular, this step may comprise:

f1. sending at least one query to a digital knowledge source;

f2. receiving at least one response from said digital knowledge source; and f3. processing said semantic structures based on said response.

The digital knowledge source may comprise any of the following: an ontology; a database; a knowledgebase; and services, brokers and agents accessible through a wide-area network.

The semantic network will preferably have a data structure comprising: concepts; relations between said concepts; and concept/relation metadata.

In particular, concepts and relations may be arranged in the form of concept-relation-concept (CRC) triples, as they (i.e. CRC triples) are well known in the art. The concept/relation metadata may be specific for the human-machine interaction of the present invention. The concept/relation metadata ("enriched metadata") may comprise at least one of: a numeric weight associated with each concept (the weight may be positive or negative, in the latter case showing "negative affinity", to be described below); a comment associated with at least one concept or at least one relation; a tag for annotating at least one concept; an (internal) identifier for said tag; a numeric weight associated with said tag; a source indication of each concept (user or machine); an (internal) identifier for each concept or relation; a timestamp for each concept or relation, showing, e.g., when the concept or relation was included into the semantic network; and a concept similarity directive, i.e., a measure how similar further concepts to be related to an existing concept should be. The process of producing concept/relation metadata may also be referred to as reification. Given that a CRC triple is a semantic relation, reification entails the process of making semantic relations (metadata) about semantic relations (data).

Resources may be represented by a resource structure comprising: a unique identifier, such as a Uniform Resource Locator (URL); and resource metadata associated with the resource. Resource metadata is expressed as a semantic network.

The resource metadata may comprise at least one of: a source indication of the resource (user or machine); a reference to all or part of the resource (e.g., text portions thereof or pointers to text portions); a resource title; a numeric weight associated with the resource (the weight may be negative, in the latter case showing "negative affinity"); an (internal) identifier for the resource; and a timestamp for the resource, showing, e.g., when the resource was last accessed.

The method may further comprise a step of providing control parameters to the server, said control parameters comprising at least one of: a limit on new connections to be contained in said modified semantic network; a limit on a depth of new connections to be contained in said modified semantic network; a concept similarity threshold to be applied in processing semantic structures; a limit on a number of new resources from which semantic structures are to be extracted; and an absolute limit on the maximum depth of relations in said modified semantic network. Control parameters are captured as semantic relations.

In another aspect of the invention, there is provided a client computer program product comprising computer program code for controlling one or more processors of a client computer to carry out the following steps:
  a. creating a semantic network comprising at least one root concept;
  b. transmitting information about the semantic network from the client computer to a server;
  c. providing information about at least one resource to the server;
  d. receiving information about a modified semantic network from the server;
  e. presenting the information about the modified semantic network to a user;
  f. receiving a response from the user;
  g. based on said response, further modifying said semantic network;
  h. receiving instructions from the user on whether to repeat modification of the semantic network; and
  j. depending on the instructions, repeating steps b to h.

In general, the client computer program product comprises code for carrying out all those steps of the method of the present invention that are to be carried out by the client computer. The computer program product may be provided in any computer-readable form (source code, machine code or any metacode) on any suitable data carrier, including traditional data carriers such as diskettes, CD-ROM, DVD-ROM, flash memory etc., or any volatile or non-volatile memory accessible via a wide-area network, such as the Internet.

In particular, the product may comprise code for:
  c1. querying a user for said at least one resource;
  c2. receiving a response from the user about the at least one resource; and
  c3. based on said response, transmitting information about the at least one resource from the client computer to the server.

The product may further comprise code for:
  c1a. carrying out an automated search in a set of resources available via a wide-area network;
  c1b. rating results of said search for their relevance;
  c1c. presenting the user with the rated results; and
  c1d. querying the user for a selection from the rated results.

The product may include code for creating a data structure comprising: concepts; relations between said concepts; and concept/relation metadata, i.e., code for creating a semantic network with enriched metadata as discussed above.

The product may further comprise code for creating a resource structure for said at least one resource, the resource structure comprising: a unique identifier; and resource metadata associated with the resource, as discussed above.

The product may also comprise code for providing control parameters to the server as discussed above.

In a preferred embodiment, the code implements a plug-in for a web browser.

In yet another aspect of the invention, there is provided a server computer program product comprising computer program code for controlling one or more processors of a server to carry out the following steps:
  a. receiving information about a semantic network comprising at least one root concept from a client computer;
  b. receiving information about at least one resource from the client computer;
  c. extracting semantic structures from the at least one resource;
  d. processing said semantic structures, for determining a measure of their significance for the semantic network;
  e. modifying the semantic network, based on the processed semantic structures; and
  f. transmitting information about the modified semantic network to the client computer.

In general, the server computer program product comprises code for carrying out all those steps of the method of the present invention that are to be carried out by the server. Again, the computer program product may be provided in any computer-readable form on any suitable data carrier.

The server computer program product may, in particular, comprise code for:
  b1. automatically determining said at least one resource by analyzing said semantic network; and
  b2. accessing said at least one resource.

The product may further contain code for automatically determining said at least one resource by:
  b1a. carrying out an automated search in a set of resources available via a wide-area network; and
  b1b. receiving results from said automated search.

The product may also comprise code for processing said semantic structures by:
  d1. sending at least one query from said server computer to a knowledge source;
  d2. receiving at least one response from said knowledge source by the server computer; and
  d3. rating said semantic structures based on said response.

In yet another aspect of the invention, there is provided a computer program package ("bundle") comprising: a client computer program product as defined above; and a server computer program product as defined above.

In a further aspect of the invention, there is provided a system specifically adapted for carrying out the method of the present invention. Generally speaking, the system will comprise a client computer and a server. The client computer comprises a CPU, memory, an input device (such as a keyboard and/or a mouse etc.), an output device (such as a monitor screen), and a communication interface for communication with a network (such as an Ethernet port or a WLAN facility). The server comprises at least one server computer, possibly a plurality of server computers to form a local-area network (LAN), each server computer comprising a CPU, memory, and a communication interface. Each of the client computer and the server comprise components (which will generally be implemented in software being executed on the hardware) specifically adapted to carry out certain steps of the method of the present invention. In particular, a system for developing a semantic network is provided, the system comprising a client computer and a server, A. the client computer comprising:

a. a component configured to create a semantic network comprising at least one root concept;

b. a component configured to transmit information about the semantic network from the client computer to the server computer;

c. a component configured to provide information about at least one resource to the server computer;

d. a component configured to receive information about a modified semantic network from the server computer;

e. a component configured to present the information about the modified semantic network to a user;

f. a component configured to receive a response from the user;

g. a component configured to further modify said semantic network based on said response;

h. a component configured to receive instructions from the user on whether to repeat modification of the semantic network;

B. the server comprising:

j. a component configured to receive information about a semantic network comprising at least one root concept from the client computer;

k. a component configured to receive information about at least one resource from the client computer;

l. a component configured to extract semantic structures from the at least one resource;

m. a component configured to process said semantic structures, for determining a measure of their significance for the semantic network;

n. a component configured to modify the semantic network, based on the processed semantic structures; and o. a component configured to transmit information about the modified semantic network to the client computer.

In particular embodiments, the server may comprise a plurality of server computers configured to extract said semantic structures from the at least one resource and to process said semantic structures, since these steps are relatively intensive on CPU time.

Further advantageous embodiments of the invention are laid down in the dependent claims.

The present invention addresses a profound problem: epistemology and the Web. How is one to understand and work with a global, ungoverned, incalculable, exponentially growing mass of semi-structured and unstructured data? Is it the Semantic Web?

The Semantic Web is an open architecture to express knowledge in increasingly sophisticated ways—it does not govern what knowledge will be constructed nor by whom. In fact, the Semantic Web is more about epistemological evolution than it is about intelligent design: of the many small islands of knowledge (ontologies), the good will be separated from the not-so-good by laws of natural selection. Because of the non-existence of absolute knowledge, the Semantic Web is forced to be complex and intricate. And if everything is relative, then one of the most compelling problems to solve for shared and organized knowledge is trust.

A compelling alternative to shared knowledge is personal knowledge. Personal knowledge alleviates the need for a priori models, rigorous formalism, and knowing what to do about the trust problem. But, in order for a personal knowledge approach to succeed in the face of information that is overwhelming, without structure and highly amenable to change, the human has vital need of the machine. To be absolutely clear, in order for the personal knowledge approach to succeed, human and machine must collaborate in co-dependent fashion, seamlessly. In the large scheme of things, the successful articulation of a protocol for human-machine interaction to exchange and acquire personal knowledge is as all-encompassing important as the Semantic Web is for shared knowledge.

The present invention considers the semantic network as the sine qua non for human-machine interaction. A semantic network allows both human and machines to add knowledge in the form of triples: subject-predicate-object (concept-relation-concept). When adding a new knowledge triple to a semantic network, both human and machine may be allowed to weight the significance of concepts, comment on the concepts and annotate the concepts with tags. Tags are text expressions which embellish the meaning of a concept. They too are weighted by their semantic contribution or significance to a concept.

The present invention, therefore, allows each concept (and relation) to have enriched semantic metadata: the source of the concept (user or machine), a numerical weight to define the significance of a concept, a system generated unique identifier and timestamp, unstructured text for comments/notes from the user or information extraction fragments from the machine and a set of tags, each of which is weighted and identified as being either human or machine generated. Metadata is expressed as semantic relations in the semantic network, in a process which may be referred to as reification.

Preferably, rules of human-machine interaction do not allow the machine to delete a concept from the semantic network. A machine can modify a concept by changing its weight or by adding tags which provide further context to a concept. In general, however, the machine is not permitted to override human provided semantic metadata—it can only add it to it.

A numeric weight is not the only measure of concept significance in the semantic network. The importance of a concept also derives from its position in the semantic network, specifically proximity to the root concept, the number of connections emanating from the concept (links out) and the number of connections pointing to the concept (links in). All these things provide for "conceptual affinity", meaning attractiveness towards making new connections.

The human-machine protocol also allows for "conceptual dislike" or "conceptual unattractiveness", i.e. negative affinity. Conceptual dislike, which is a negative weight assigned to a concept, prohibits the machine from making any new connections along a particular conceptual path. In such a manner, the user guides the machine towards semantic relevance. For example, if the root concept or major focus of a semantic network is "financial investment", a user might assign a negative value to the concept "credit default swaps" in order to exclude credit default swaps from being a consideration in an investment strategy.

The machine invokes a conceptualization process in order to add new connections to a semantic network of personal knowledge. The resources from which the conceptualization process draws upon can either be generated by the machine or specified by the user. Resources for conceptualization may be identified by a well-formed Uniform Resource Locator (URL) for remote access. In the human-machine interaction protocol, resources, like concepts, may have enriched metadata: attribution of resource to user or machine, reference to all or part of the resource, title of the resource, human or machine generated numeric weight to indicate significance of the resource, system generated unique identifier and timestamp, a provision for user or machine comments.

Human-machine interaction allows for a resource to be assigned a negative value, meaning that all concepts found in the resource will have conceptual unattractiveness. Continuing from the above example, if a document with a negative value not only refers to "credit default swaps", but also to associated concepts like "credit debt obligations", "credit loan obligations", etc., then all these concepts would be considered inappropriate to the construction of a semantic network on "financial investment", at least for that user.

For every step in the interaction between human and machine, the present invention also allows the human element the possibility of moderating the machine expansion of the semantic network. An exchange between human and machine can be restricted either by an arbitrary limit on new connections and/or the depth of new connections. Here, depth is defined to be the number of arcs or edges of a new concept to an existing concept in the semantic network. The greater the depth, the more freedom the machine has with respect to adding new knowledge per interaction between human and machine.

The ability to moderate the machine expansion of a semantic network for personal knowledge per human-machine exchange is fundamental to the human machine collaboration model. It enables the user to acquire machine generated knowledge in piecemeal or stepwise fashion, with the opportunity to modify the semantic network after every machine invocation. The user can make repeated requests to the machine until no more new connections can be made. In other instances, say for certain topic domains and/or a particular set of resources, the machine could be granted a much greater degree of freedom for semantic network extension, making all possible connections, say, in one invocation.

Features and advantages of the present invention include providing:

- a facility to decompose a document into concepts and relations using information extraction techniques that might be dependent or independent of a priori knowledge;
- a facility to recompose a decomposed document into various forms, ranging from concept maps, facts, summaries, keywords, back-of-the-book style index, etc.;
- a complementary navigation facility that hyperlinks document representations, allowing seamless viewing of multiple perspectives;
- knowledge compression features;
- a facility to accommodate different reading objectives (a lookup of facts, a document overview, an in-depth analysis of a topic, a comparison of documents on a particular subject, etc.);
- functionality to personalize each reading experience which include delegation of control and intention to the reader;
- functionality to capture reading experience based on document representations, the artifacts referenced by the user (what summaries were generated, for example), the nature of user input, the record of hyperlinked activities, etc.;
- human-machine collaboration techniques to personalize the structure and organization of data, to infer from user experience the significance of concepts within documents, to modify machine inferences, etc.;
- functionality to interleave documents along thematic lines using semantic networks, thereby allowing many documents to be treated as one;
- a facility to auto-cluster facts, concepts and documents around user-defined and/or machine generated topics of interest;
- functionality to drill down and/or roll up unstructured text and/or structured text;
- accreditation of extracted knowledge to originating sources such as known document authors.

In accordance with another aspect of the present invention, there is provided a method of generating a document representation. The method includes: receiving into a memory of a system a resource containing at least one sentence of text information, the system comprising a server and a client computer; producing in response to each of the at least one sentence a system-storable tree comprising a plurality of tree elements and grammatical relations between the tree elements, each of the tree elements indicating a part-of-speech contained within the each sentence; producing in response to each of the trees one or more semantic structures such that each of the semantic structures may include three the tree elements selected by the system such that the each semantic structure represents a simple clause associated with the each tree; and storing in the memory the one or more semantic structures in association with one or more connections between common ones of the tree elements, thereby generating a set of one or more semantic networks representing the resource.

Producing in response to each of the trees one or more semantic structures such that each of the semantic structures may include three the tree elements selected by the system such that the each semantic structure represents a simple clause associated with the each tree may include producing one or more Resource Description Framework (RDF) statements comprising RDF elements. Storing in the memory the one or more semantic structures in association with one or more connections between common ones of the tree elements, thereby generating a set of one or more semantic networks representing the resource, may include storing the one or more RDF statements in association with one or more connections between common ones of the RDF elements. The method may further include receiving as user input into the memory a root concept and associating the root concept with the resource. The method may further include: presenting at the client computer information about the set of one or more semantic networks; receiving a response from the user; and, based on the response, modifying the set of one or more semantic networks, including augmenting the semantic network with metadata. Presenting at the client computer information about the set of one or more semantic networks may include presenting a proposed fact comprising at least one of the one or more semantic structures. Receiving a response from the user may include receiving user input selected by the user from the group consisting of an acceptance of the proposed fact and a rejection of the proposed fact. Receiving into a memory of a system a resource containing at least one sentence of text information may include receiving at least one of: unstructured data; structured data; and services, brokers and agents. Receiving into a memory of a system a resource containing at least one sentence of text information may include: at the client computer, querying a user for the resource; at the client computer, receiving a response from the user about the resource; based on the response, transmitting information about the resource from the client computer to the server. The step of querying the user for the resource may include: carrying out an automated search in a set of resources available via a wide-area network; rating results of the search for their relevance to the root concept; presenting the user with the rated results; and querying the user for a selection from the rated results. The method may further include: at the server, automatically determining a further resource by analyzing the set of one or more semantic networks; accessing the further resource by the server; and, based on the further response, modifying the set of one or more semantic networks. The step of automatically determining a further resource may include: carrying out an automated search in a set of resources available via a wide-area network; and receiving results from the automated search at the server. The method may include: sending at least one query to a digital knowledge source; receiving at least one response from the digital knowledge source; and processing the one or more semantic structures based on the response. The digital knowledge source may include at least one of: an ontology; a database; a knowledgebase; and services, brokers and agents accessible through a wide-area network. Storing in the memory the one or more semantic structures in association with one or more connections between common ones of the tree elements, thereby generating a set of one or more semantic networks representing the resource, may include storing metadata in association with the one or more semantic structures. Storing metadata in association with the one or more semantic structures may include storing as semantic relations at least one of: a numeric weight associated with at least one the tree element; a comment associated with the at least one tree element; a comment associated with at least one the connection; a tag for annotating the at least one tree element; an identifier for the tag; a tag numeric weight associated with the tag; a source indication of the at least one tree element; an identifier for the at least one tree element; an identifier for the at least one connection; a timestamp for the at least one tree element; a timestamp for the at least one connection; and a concept similarity directive. Receiving into a memory of a system a resource containing at least one sentence of text information may include storing in the memory a unique identifier for the resource and storing resource metadata in association with the unique identifier. Storing resource metadata in association with the unique identifier may include storing as a semantic relation at least one of: a source indication of the resource; a reference to all or part of the resource; a resource title; a resource numeric weight associated with the resource; and a timestamp for the resource. The method may further include providing control parameters to the server, the control parameters expressed as semantic relations and comprising at least one of: a limit on new connections to be contained in the set of one or more semantic networks; a limit on a depth of new connections to be contained in the set of one or more semantic networks; a concept similarity threshold to be applied in processing the one or more semantic structures; a limit on a number of new resources from which the one or more semantic structures are to be extracted; and an absolute limit on the maximum depth of relations in the set of one or more semantic networks. The method may further include presenting at the client computer an output representation comprising at least one of: a concept map, a facts listing; a text summary; a tag cloud; an index; and an annotated text. Presenting at the client computer at least one of a concept map, facts listing, a text summary, a tag cloud, an index and an annotated text may include determining link counts of the one or more connections, producing in response to the one or more semantic structures and the link counts facts and fact weights associated with the facts, respectively, and presenting the facts in an order determined in accordance with the fact weights. Presenting at the client computer at least one of a concept map, facts listing, a text summary, a tag cloud, an index and an annotated text may include receiving as user input a summary length, determining link counts of the tree elements and selecting the summary length number of the at least one sentences having highest the link counts. The method may further include receiving a user selection of one or more keywords, and wherein selecting the summary length number of the at least one sentences having highest the link counts may include selecting the summary length number of the at least one sentences in accordance with the keywords. Presenting at the client computer at least one of a concept map, facts listing, a text summary, a tag cloud, an index and an annotated text may include determining link counts of the tree elements, producing keyword weights associated with words of the at least one sentence in accordance with the link counts, selecting among the words one or more keywords in accordance with the keyword weights and presenting the keywords. Presenting at the client computer at least one of a concept map, facts listing, a text summary, a tag cloud, an index and an annotated text may include presenting an alphabetical listing of the keywords, the keywords being hyperlinked to occurrences of the keywords within at least one of the facts listing and the resource. The method of claim 19 may further include storing in the memory a document use history comprising indications of user input received in association with the resource and indications of output representations presented at the client computer in association with the resource. Storing in the memory a document use history comprising indications of user input received in association with the resource and indications of output representations presented at the client computer in association with the resource may include storing the indications of user input received from a plurality of the users and the indications of output representations presented at a plurality of the client computers associated with the users, and producing statistical data in response to the document use history.

In accordance with another aspect of the present invention, there is provided a system for generating a document representation, the system comprising a server and a client computer. The system includes: means for receiving as user input into a memory of a system a resource containing at least one sentence of text information; means for producing in response to each of the at least one sentence a system-storable tree comprising a plurality of tree elements and grammatical relations between the tree elements, each of the tree elements indicating a part-of-speech contained within the each sentence; means for producing in response to each of the trees one or more semantic structures such that each of the semantic structures comprises three of the tree elements selected by the system such that the each semantic structure represents a simple clause associated with the each tree; and means for storing in the memory the one or more semantic structures in association with one or more connections between common ones of the tree elements, thereby generating a set of one or more semantic networks representing the resource.

The system may further include means for modifying the set of one or more semantic networks in response to user input. The system may further include means for automatically determining a further resource. The system may further include means for producing each of a concept map, facts listing, a text summary, a tag cloud, an index and an annotated text. The system may further include means for producing a document use history.

In accordance with another aspect of the present invention, there is provided a system for generating a document representation, the system comprising a server and a client computer. The system includes: a component configured to receive into a memory of the system a resource containing at least one sentence of text information; a component configured to produce in response to each of the at least one sentence a system-storable tree comprising a plurality of tree elements and grammatical relations between the tree elements, each of the tree elements indicating a part-of-speech contained within the each sentence; a component configured to produce in response to each of the trees one or more semantic structures such that each of the semantic structures comprises three of the tree elements selected by the system such that the each semantic structure represents a simple clause associated with the each tree; and a component configured to store in the memory the one or more semantic structures in association with one or more connections between common ones of the tree elements, thereby generating a set of one or more semantic networks representing the resource.

In accordance with another aspect of the present invention, there is provided a kit of computer program modules comprising computer program code for controlling one or more processors of at least one of a server and a client computer to carry out the following steps: receiving into a memory of a system a resource containing at least one sentence of text information, the system comprising a server and a client computer; producing in response to each of the at least one sentence a system-storable tree comprising a plurality of tree elements and grammatical relations between the tree elements, each of the tree elements indicating a part-of-speech contained within the each sentence; producing in response to each of the trees one or more semantic structures such that each of the semantic structures may include three the tree elements selected by the system such that the each semantic structure represents a simple clause associated with the each tree; and storing in the memory the one or more semantic structures in association with one or more connections between common ones of the tree elements, thereby generating a set of one or more semantic networks representing the resource. The kit of computer program modules may include computer program code for controlling on or more processors of at least one of a server and a client computer to carry out steps further defined herein above.

Other aspects and features of the present invention will become apparent to those of ordinary skill in the art upon review of the following description of embodiments of the invention in conjunction with the accompanying figures and claims.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings:

FIG. 4 illustrates elements of the open information extraction process that takes place on the machine (server) side. In particular, a body of text is split into sentences and each sentence is parsed into syntactic and semantic information, described by Penn Treebank part-of-speech tags. The sentence's linguistic tree is subsequently used to create simple subject-verb-object clauses which are then, along with annotations resident in the document container, submitted to a process of conceptualization.

FIGS. 6-15 illustrate hypothetical screen shots of a web browser as an exemplary user interface.

FIG. 20 shows an exemplary Facts Listing type output representation produced by the system.

FIG. 21 shows an exemplary Summary type output representation produced by the system.

FIG. 24 shows an exemplary annotated Notes type output representation produced by the system.

DETAILED DESCRIPTION

The present invention's focus includes the capture of the user reading experience, based on the various forms of document decomposition and re-composition. In turn, the user reading experience capture is used by machine intelligence to further improve the user reading experience. The system and method involves the application of novel embodiments of technology to electronic documents that are manipulated into forms amenable to information processing by a variety of computing devices.

Figure 1:
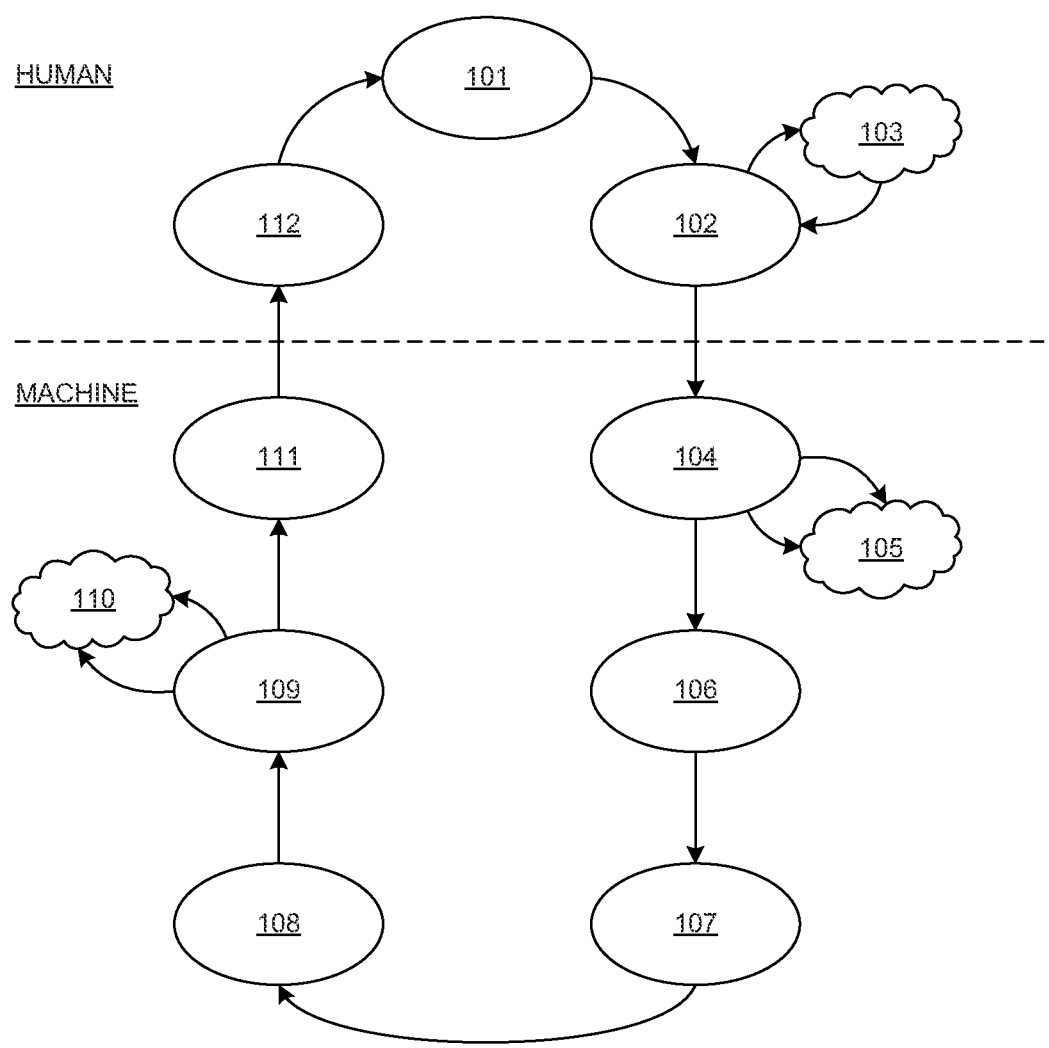
FIG. 1 provides a context view of a preferred embodiment of the invention. The drawing highlights the relationship between human and machine, their roles and activities, their interaction and the construction of personal knowledge as a semantic network with recourse to Web resources and services.

FIG. 1 illustrates, for a preferred embodiment, in detail the relationship and responsibilities of human and machine in the creation and acquisition of personal knowledge. The iterative development of personal knowledge starts with the user in step 101. In this step, the user starts with the creation, and if necessary, modification of a semantic network. The minimum expression of a semantic network is a root concept, i.e. the focal point or topic of interest with respect to personal knowledge. There is nothing to stop the user from editing the semantic network based on personal knowledge before invoking the machine. The next step that the user might undertake is the specification of resources that are relevant to the personal knowledge domain (step 102) by surfing the web (symbol 103). Step 102 is optional because, if the user does not specify resources, the machine can invoke a discovery step 104 based on the concepts contained in the semantic network. The discovery mechanism utilizes semantic-based searching and web-crawling in the web (symbol 105). With resources in hand, the machine is then responsible for a step of preprocessing text-based documents, specifically identifying text zones, splitting sentences and tokenizing (step 106), then performing a step of lexical and terminological analysis (step 107), executing a step of syntactic analysis leading to incipient semantic structures, i.e. concept-relation-concept triples (step 108). Steps 106-108, which entail natural language processing, can be found in most information extraction systems known from the prior art. A subsequent key function of the machine is conceptualization and disambiguation (step 109). This requires the machine to use internal and external knowledge sources to determine appropriate concepts and their relations, and the significance of both with respect to the main interest of personal knowledge expressed by the user. In this function, the machine harnesses web intelligence, essentially a formulation of requests to web services, agents, brokers, databases, ontologies, etc., as symbolized by symbol 110. Since the human-machine exchange is based on messages involving semantic network representation, the final step carried out by the machine is to compose a new semantic network (step 111). It is then the obligation of the user to accept or reject the machine expansion of personal knowledge (step 112). This cycle of steps repeat until the user's personal knowledge needs have been met.

FIG. 1 illustrates two important aspects of the invention. The first is that the system is dichotomized between human and machine; the second is that human-machine interaction for the type of problem being solved is fundamentally iterative and collaborative in nature. Hence, the current system contains two separate physical entities exhibiting different behaviors. In order to get two entities or systems to work together, a communication protocol is required. Another term for this protocol is an application programming interface (API). An API is a contract or formalization of behavior.

Figure 2:
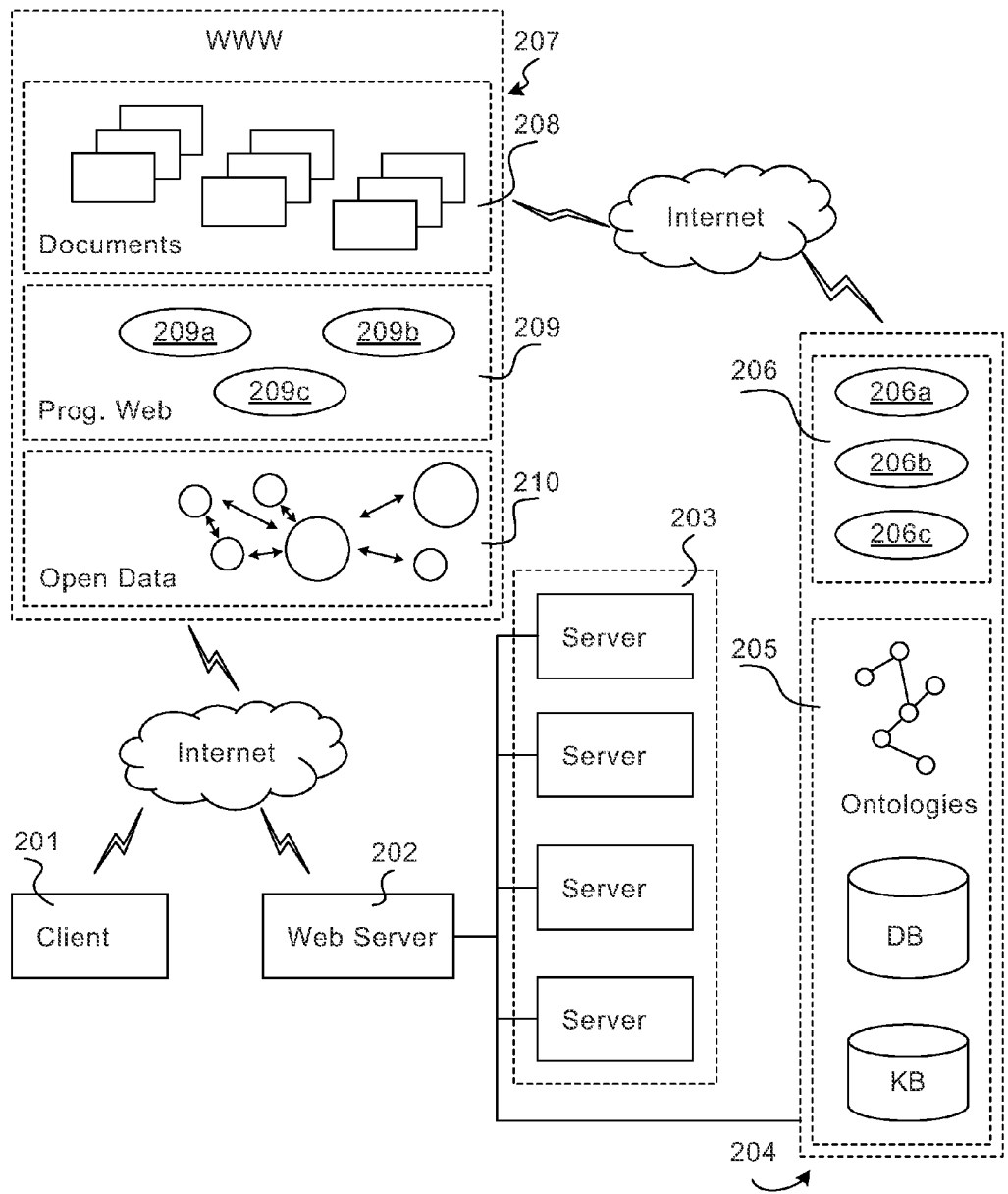
FIG. 2 is an example physical view of a preferred embodiment of the invention. The user pursues and formulates personal knowledge through a user interface, which has access to both the World Wide Web and the services of a machine, either through the Internet or any other embodiment of a wide area network. The machine side of the invention is comprised of a web server to handle client requests, many servers for distributed problem solving, internal database and knowledgebase resources, and external agents to access Web data and services to meet processing objectives.

An application programming interface enables a client-server programming model, whereby any number of different client implementations and any number of different server implementations are possible, provided that the API contracts are fulfilled. FIG. 2 presents a preferred physical embodiment of the present invention. The fundamental human and machine elements communicate through client 201 and web server 202, respectively. Communication takes place via the Internet or, alternatively, any other type of wide area network (WAN). Essentially, both human and machine must have comparable access to resources. This is the case, for example, on the World Wide Web 207. Resources can be in the form of documents or unstructured data 208, services 209a, agents 209b and brokers 209c in the "programmable web" 209, and/or structured, open data 210. The ability of the machine to contribute to personal human knowledge depends upon its capabilities. Many of the steps outlined in FIG. 1 are both computationally and memory intensive, requiring access to large amounts of supporting data. In short, harnessing the intelligence of the web is a complex undertaking, suggesting a distributed, parallel computing approach. Hence, in the present example, a web server 202 is merely to give the machine presence on the Web. Behind the web server is an array of servers 203 for parallel computation and network access to internal and external knowledge sources 204, such as ontologies, databases (DB) and knowledgebases (KB) in box 205 or services 206a, brokers 206b and agents 206c in box 206, in order to deal in programmatic fashion with similar entities in the World Wide Web environment, to carry out web crawls on unstructured text and/or perform SQL or SPARQL requests on structured data. The client 201, web server 202, server 203 and knowledge sources 204 may be implemented as any computing device such as a general purpose computer, microcomputer, minicomputer, mainframe computer, distributed network for computing, functionally equivalent discrete hardware components, etc. and any combination thereof, for example.

In an exemplary embodiment, the client implementation may take the form of a browser plug-in, a possible embodiment thereof to be described below. The browser plug-in allows the user to:

create/delete/modify a concept and all its attendant metadata;

create/delete/modify a concept relation and all its attendant metadata;

create/delete/modify terms belonging to a concept, and all its metadata;

add/remove a resource and all its attendant metadata;

highlight important concepts;

show or not show concepts that have "conceptual unattractiveness";

display the semantic network with or without relations;

invoke the machine expansion of the semantic network through a web service;

accept or reject new semantic network connections made by the machine, individually or as a whole;

revert to a previous version of the semantic network;

create a new semantic network from a concept in an existing semantic network, and preserve the connection;

generate various alternative representations of a semantic network, for display or machine-to-machine interchange;

locate within documents the concepts which comprise the semantic network;

convert concepts into tag clouds, tags into concepts;

create search engine expressions based on concepts of a semantic network;

rate the relevance of a document with respect to the semantic network, particularly useful for search engine results;

specify system preferences, including things like web service location, directives for the machine with respect to semantic network expansion, containing but not limited to:

concept similarity the number of new levels to add per machine invocation the maximum number of new connections that can be made per machine invocation the maximum relation depth for the semantic network the maximum number of new resources for the machine to discover with respect to the major focus of personal knowledge the maximum number of tags/terms to be assigned to each concept.

In an exemplary server implementation, the server, implementing the machine side of human-machine interaction, provides capabilities to:

create a concept and all its attendant metadata;

create a concept relation and all its attendant metadata;

add/modify terms belonging to a concept, and all its metadata;

add a resource and all its attendant metadata, if resources are missing;

when resources are missing, construct search engine queries based on the significant concepts in the semantic network, and perform link traversal on documents in order to generate new concepts that pertain to the semantic network;

preprocess documents in order to create a document container per document that describes structure and identifies parseable text zones;

split text into paragraphs, paragraphs into sentences and employ tokenizers to obtain lexical units;

invoke lexical analysis to tag parts of speech, recognize named entities, analyze coreferences, identify time and numerical expressions, delineate noun and verb chunks, and last but not least construct a parse node tree based on standard Penn Treebank tags;

using the parse node tree, create simple subject-predicate-object clauses from complex sentences using a set of rules and heuristics;

begin a process of conceptualization by building concept sets containing concept-relation-concept triples, whereby each concept set is supported by anaphora resolution and semantic interpretation using the results of previous natural language processing and various knowledge resources: upper level and domain specific ontologies, dictionaries/thesauri like Word Net, common knowledge sources of like Concept Net, etc.

use lexical chains and semantic latent indexing techniques to identify significant concepts from machine perspective;

harness the intelligence of the Web to generate new concepts, qualify the significance of existing concepts, find new relations and add tags to concepts by accessing open community knowledge sites like Wikipedia, folksonomies from social bookmarking sites like del.icio.us, Semantic Web data from the Linking Open Data project, public ontologies from research institutes and academia, web services offering information extraction services, etc.

match similar concepts based on configurable thresholds using advanced term comparisons, conceptual hierarchies and sense disambiguation through context;

compose new semantic network starting from the original semantic network in the request with new machine generated propositions, giving primacy to user provided metadata, including limitation on number and depth of new connections;

support client sessions to facilitate high frequency human-machine interactions, i.e. a true human-machine dialogue; and embed distributed and parallel computing techniques to manage the space and time burden of performing natural language processing on large documents.

Figure 3:
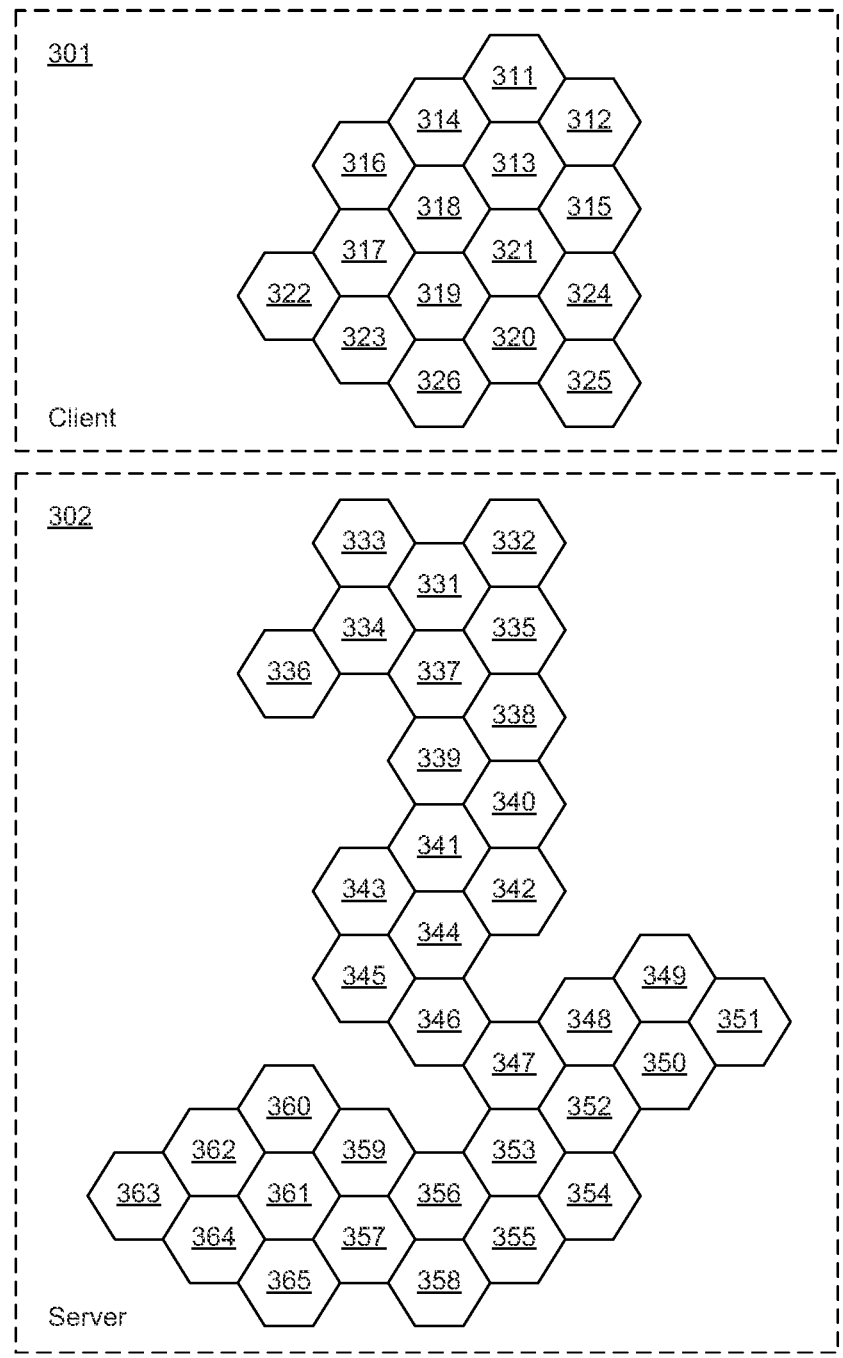
FIG. 3 is a logical view of a preferred embodiment of the invention, showing the composition of functional components and a distribution of the components adhering to the fundamental client-server physical architecture.

FIG. 3 provides a logical view of the exemplary client and server embodiments of the present invention. Box 301 comprises components for effecting client-side behavior for human-machine interaction:

311 Device Manager: low-level interface to GUI device;

312 Drag 'n Drop Handler: low-level GUI drag 'n drop behavior;

313 Concept and Relations Handler: concept and relations creation and modification;

314 Proposition Handler: concept-relation-concept triple management;

315 Preferences Handler: management of system settings;

316 Properties Handler: properties management for concepts, relations, resources, tags;

317 Resource Handler: addition and modification of resource list;

318 Tree Handler: controller on tree view of underlying semantic network;

319 Tree View: graphical user view of underlying semantic network model;

320 Semantic Network: semantic network representation of knowledge, i.e. model;

321 Knowledge Manager: semantic network construction, management and organization;

322 Page Relevance: computed relevance of open resource to current semantic network;

323 Text Selection Handler: text extraction facility for identifying parts of a resource;

324 Knowledge Export Handler: export semantic network to alternative formats;

325 Knowledge Import Handler: ingest of semantic network from alternative formats;

326 Machine Interface Handler: machine invocation management.

The exemplary server side embodiment of the present invention, effecting machine behavior, consists of the following components:

331 SOA Platform: service-oriented architecture platform;

332 Web Services Handler: SOAP/HTTP invocation of machine services;

333 REST Services Handler: XML/HTTP invocation of machine services;

334 Session Manager: session management for requests;

335 Cache Manager: cache management for requests;

336 Security: authentication and authorization of remote requests;

337 Multi-Agent Platform: generic multi-agent system;

338 Distributed Computing Platform: task decomposition, scheduling and management platform for parallel computing;

339 GATE Platform: general architecture for text extraction;

340 Semantic Search: conceptual search and web-crawling using dedicated agents;

341 Document Reader: text extraction from various external resource formats;

342 Wrapper Induction: text zone and document structure identification;

343 Sentence Splitter: identification of sentences within text zones;

344 Tokenizer: sentence parsing and lexeme creation;

345 Gazetteer: dictionaries, thesauri, directories of general knowledge, e.g. locations;

346 POS Tagger: parts-of-speech identification of sentence tokens;

347 Morphological Analyser: token lemma identification considering its part of speech;

348 Named Entity Transducer: identification of named entities of sentences' default named entity grammar;

349 Ortho Matcher: identity relations between named entities in order to perform coreferencing;

350 Nominal Coreference: anaphora resolution on named entities;

351 Pronominal Coreference: anaphora resolution on pronouns;

352 Natural Language Parser: phrase and typed dependency parsing

353 Grammar Analyser: simple clause (subject-verb-object) creation from complex sentences;

354 Lexical Chains: context resolution for ambiguous terms;

355 Latent Semantic Analysis: analysis of relationships between documents;

356 Concept Extraction: identification of significant concepts;

357 Concept Disambiguity: semantic resolution of concepts;

358 Concept Similarity: lexical and semantic concept comparison;

359 Relation Extraction: identification and refinement of concepts between relations;

360 Semantic Network Framework: knowledge representation framework;

361 Semantic Network Composition: knowledge builders using semantic networks;

362 Knowledgebase Manager: semantic network storage, indexing and search;

363 Database Manager: structured data storage;

364 Metadata Repository: ontological and schema models;

365 Read Write Web: different access strategies to World Wide Web resources.

The human-machine interaction literally requires the machine to be able to read and understand text, attributing significance to important concepts. This must be done without restricting the user to specific knowledge domains, without circumscribing the user's personal knowledge and without confining knowledge acquisition to a small, homogeneous set of resources. This requires that traditional information extraction, championed by Message Understanding Conferences, give way to open information extraction (OIE)—"a novel extraction paradigm that facilitates domain independent discovery of relations extracted from text and readily scales to the diversity and size of the Web corpus".

FIG. 4 illustrates a small but important element of open information extraction. In box 401 a set of sentences is presented that can come from any arbitrary set of resources. The objective is to convert each sentence to a set of concept-relation-concept (CRC) triples. There are many ways to do this. The exemplary embodiment of the present invention invokes natural language parsing, both phrase structure parsing and typed dependency parsing. Box 402 shows the result of phrase parsing of the highlighted sentence in box 401. The parts-of-speech tags are from the Penn Treebank Tagset. The results of natural language processing are used to decompose complex sentences into a set of simple clauses (box 403). These simple clauses undergo three immediate post-processing steps: resolution of coreferences, concept simplification and relation remediation. From there, proper concept-relation-concept and semantic network construction begins.

Even though the embodiment of the present invention uses open information extraction techniques, it is not an open information extraction (OIE) system.

"The sole input to an OIE system is a corpus, and its output is a set of extracted relations. An OIE system makes a single pass over its corpus guaranteeing scalability with the size of the corpus." "Open Information Extraction from the Web" Michele Banko, et. al.

An OIE system is biased towards web-crawling. The present invention uses such OIE techniques to create semantic structures with little need for a priori knowledge.

Human-machine interaction to build personal knowledge is collaborative, and requires memory of previous steps as well as statements of current intent. The implication is that the human and machine need to adjust as personal knowledge expands and is refined.

Figure 5A:
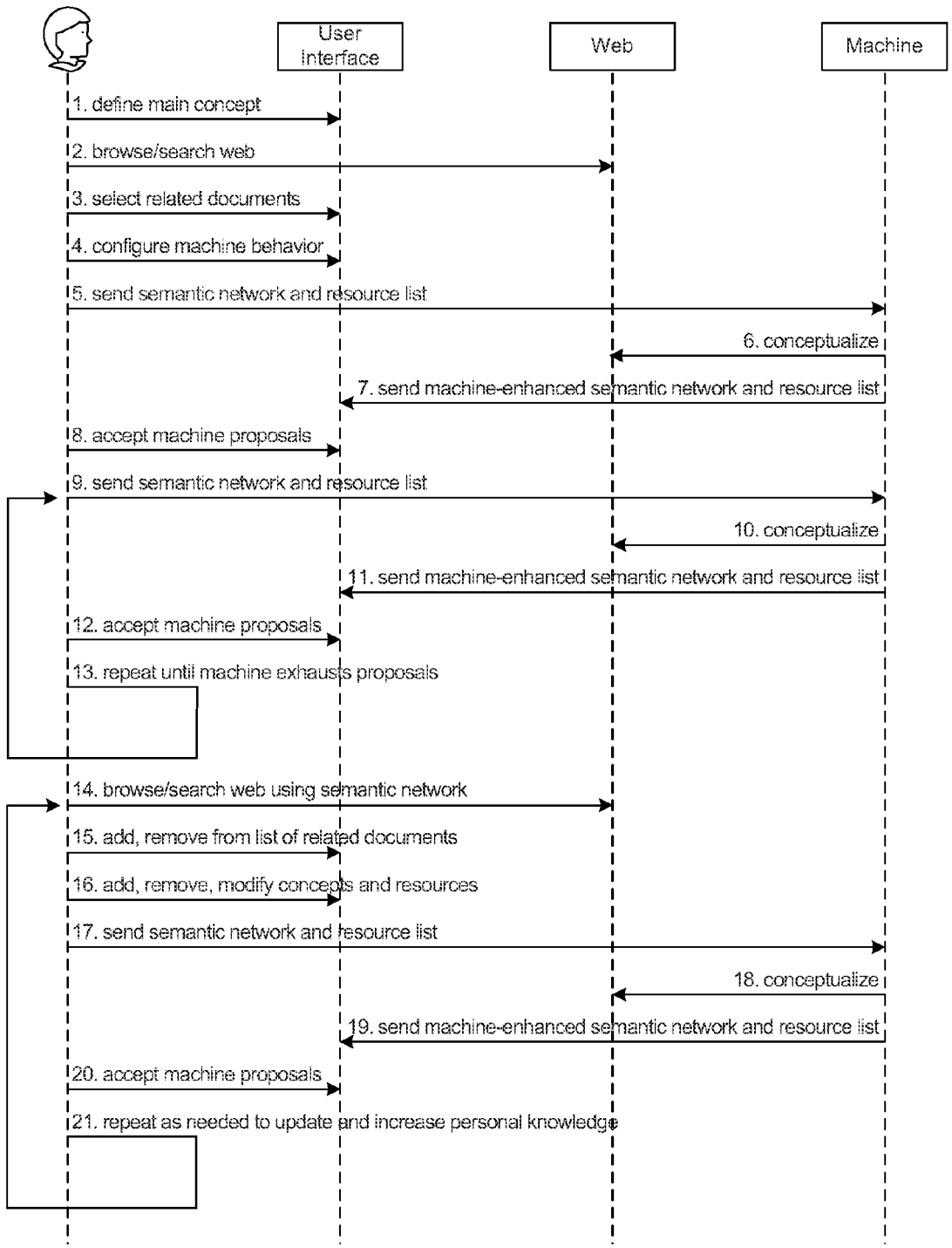
FIG. 5A is a sequence diagram illustrating one of many possible interaction sequences between human and machine. The brunt of the machine work is encapsulated as "conceptualize" in the diagram in order to focus more on the exchange of messages between user and machine, and how the machine expands personal knowledge that is either accepted or rejected by the user.
Figure 5B:
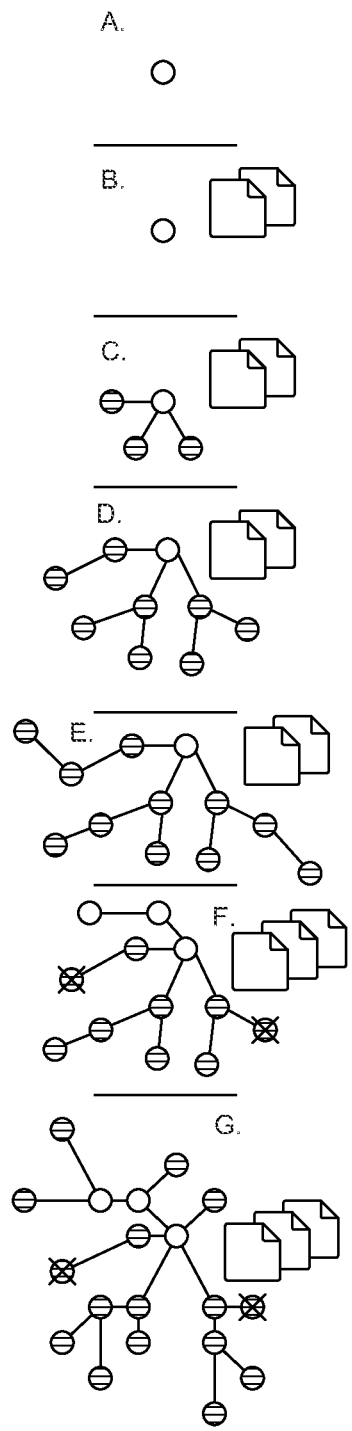
FIG. 5B illustrates the growth of the resulting semantic network in the course of the sequence of FIG. 5A.

FIGS. 5A and 5B show an example of this human-machine dialogue, of past and current interaction, of striving towards personal knowledge resolution. The three primary actors in the system are the user, machine and the Web. The start of personal knowledge is simply the definition of a main or root concept by the user (FIG. 5A, step 1). This is represented by single light node (FIG. 5B, graph A). After the user browses and search on the Web (FIG. 5A, step 2), he/she can select some resources (documents) related to the main concept (FIG. 5A, step 3). Prior to sending this information set to the machine, the user is able to adjust the machine directives that will influence the human-machine dialogue (FIG. 5A, step 4). In the very first invocation of the machine, the user sends a semantic network consisting of a main or root topic, and references to related sources (FIG. 5B, graph B). The machine responds with an expanded semantic network (FIG. 5A, graph C). Machine-generated knowledge is represented by dark circles in the graph.

Upon receiving the machine enhanced semantic network and resource list, the user either accepts or rejects some or all of the machine's proposals (FIG. 5A, step 8). The accepted proposals are made part of the user's personal knowledge. This user approved semantic network can be sent right back to the machine (FIG. 5A, step 9), permitting the machine to make new semantic connections to the just approved connections. FIG. 5B, graph D illustrates the next step machine expansion of the semantic network, showing the resource list as unchanged. It is critical to note that the user is given stepwise control of the machine workings. Stepwise processing can proceed until the use is satisfied with what has been built by the machine or the machine exhausts all possible proposals given the current resource list (FIG. 5A, steps 9-13).

In the interaction with a machine, the user can at any time browse and search the web (FIG. 5A, step 14), add or remove documents from the resource list (FIG. 5A, step 15), add, remove, modify concepts and relations (FIG. 5A, step 16). All this information is recorded (FIG. 5A, graph F) and transferred to the machine (FIG. 5A, step 17). This sharing of intention enables the machine to expand personal knowledge in the direction set by the user. FIG. 5B, graph G shows the machine expanded semantic network having connections to new and existing concepts, and avoiding new connections to concepts assigned negative affinity (circles with crosses). The process (FIG. 5A, steps 14-21) repeats until the user reaches a level of personal knowledge that is valuable to both learning and understanding.

Because the present invention encompasses that personal knowledge be exchanged between human and machine, some degree of knowledge representation is required. A semantic network is an appropriate choice. It not only has the simplicity and utility desired by most users, but underpins more sophisticated models of knowledge representation, the Semantic Web being a case in point. The present invention, therefore, allows users to not only acquire personal intellectual capital, as in "make me smarter", but to disseminate or connect personal knowledge with publicly shared knowledge bases and services.

A key benefit of the present invention is that machines can help humans extract and summarize information from unstructured text. The insight comes from the realization that machines can vastly reduce the human effort when free of the burdens associated with generating public, formal, correct, absolute knowledge. One observation is that if human-guided machine-generated personal knowledge is relatively effortless, the barriers to sharing knowledge are reduced. Hence, over time, the greatest contribution of the present invention might be the bottom-up dissemination of structured personal knowledge towards the grand vision of the World Wide Semantic Web.

Personal knowledge formally represented as a semantic network and expressed in a public standard format like RDF and Topic Maps lends itself to many different applications. One application is conceptual search based on a collection of documents, provided that the documents can be distilled to a semantic network that is human-machine generated. Another application is the invocation of web services using semantics. Users can use human-directed machine-generated product descriptions to shop on sites like amazon.com and ebay. Semantic networks facilitate comparison, allowing personal knowledge to be tested and improved against external knowledge. User documents can be converted to semantic networks with the assistance of a machine, and then expanded upon by the dynamics of the present invention. In short, there is no limit to the utility of formally represented personal knowledge when it can be understood and executed on the Web.

FIGS. 6-15 show hypothetical screen shots of a web browser as an exemplary user interface on the client side. Here the user interface is implemented as a web browser plug-in, but this is not the only possible implementation of a client in the basic physical client-server architecture.

Figure 6:
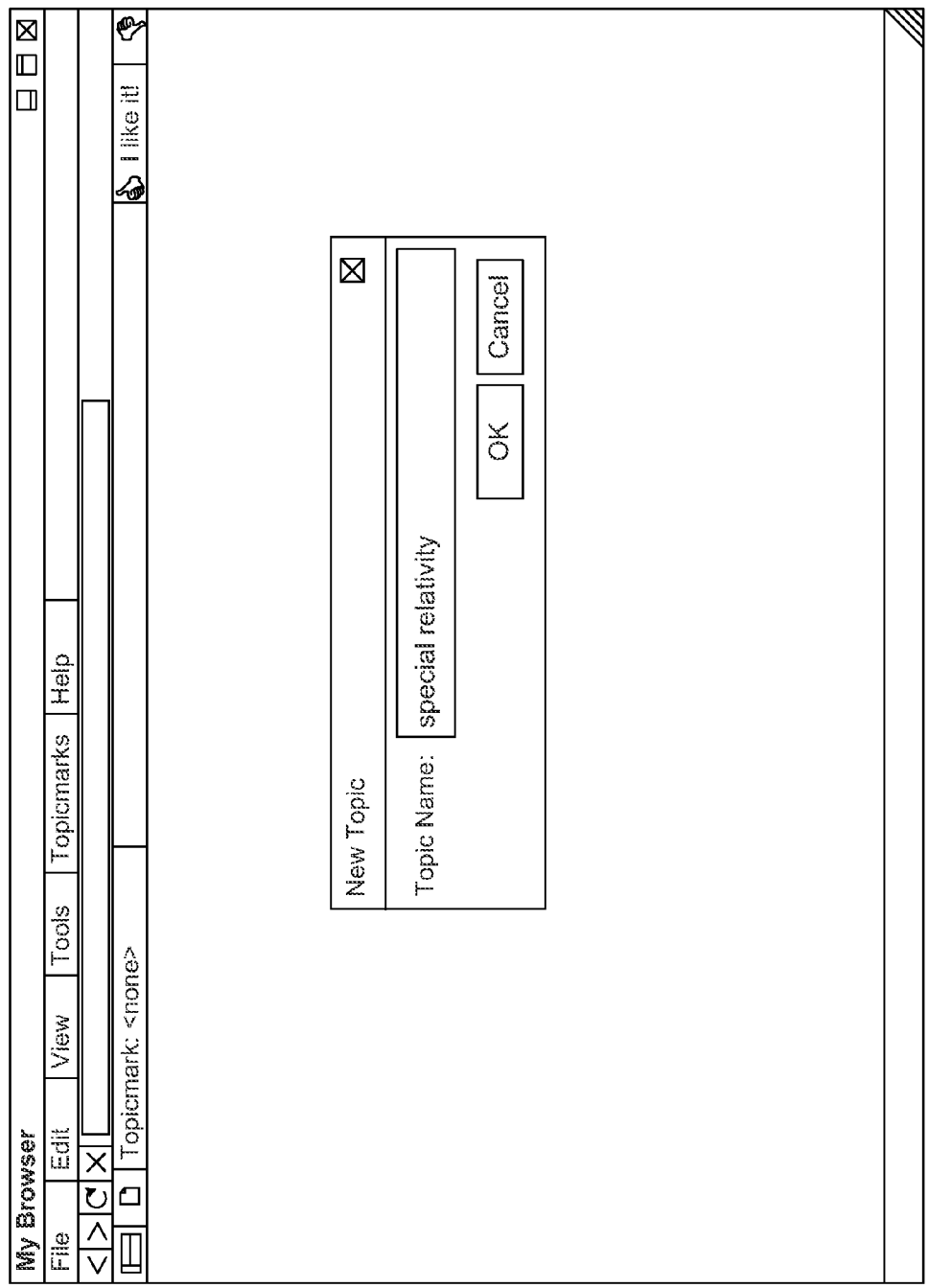

FIG. 6 shows how a user would begin a pursuit of personal knowledge by defining a topic or focus of interest, here "special relativity".

Figure 7:
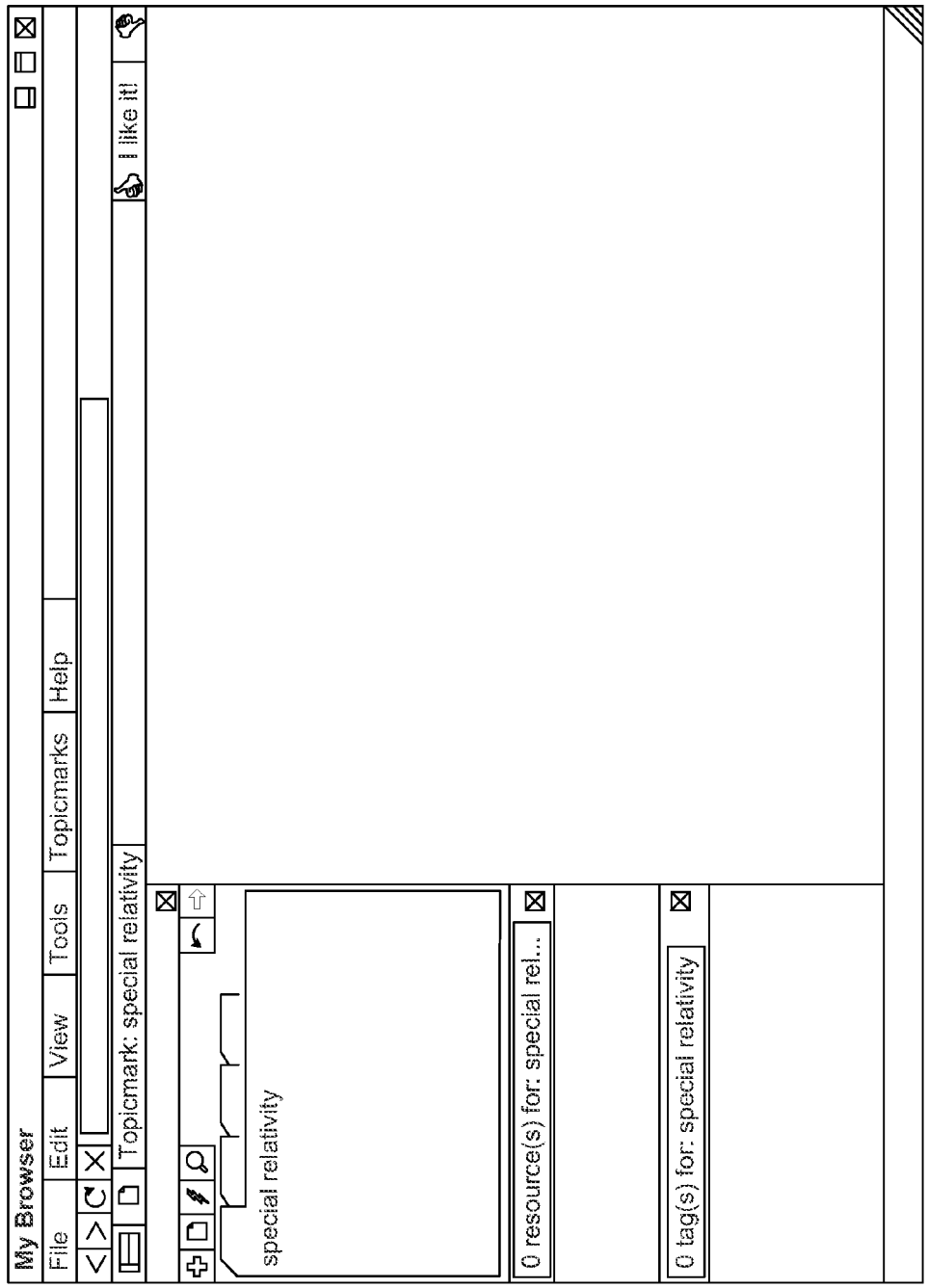

FIG. 7 depicts the browser showing the topic of interest as a root node or concept in a semantic network, sometimes known as a concept map.

Figure 8:
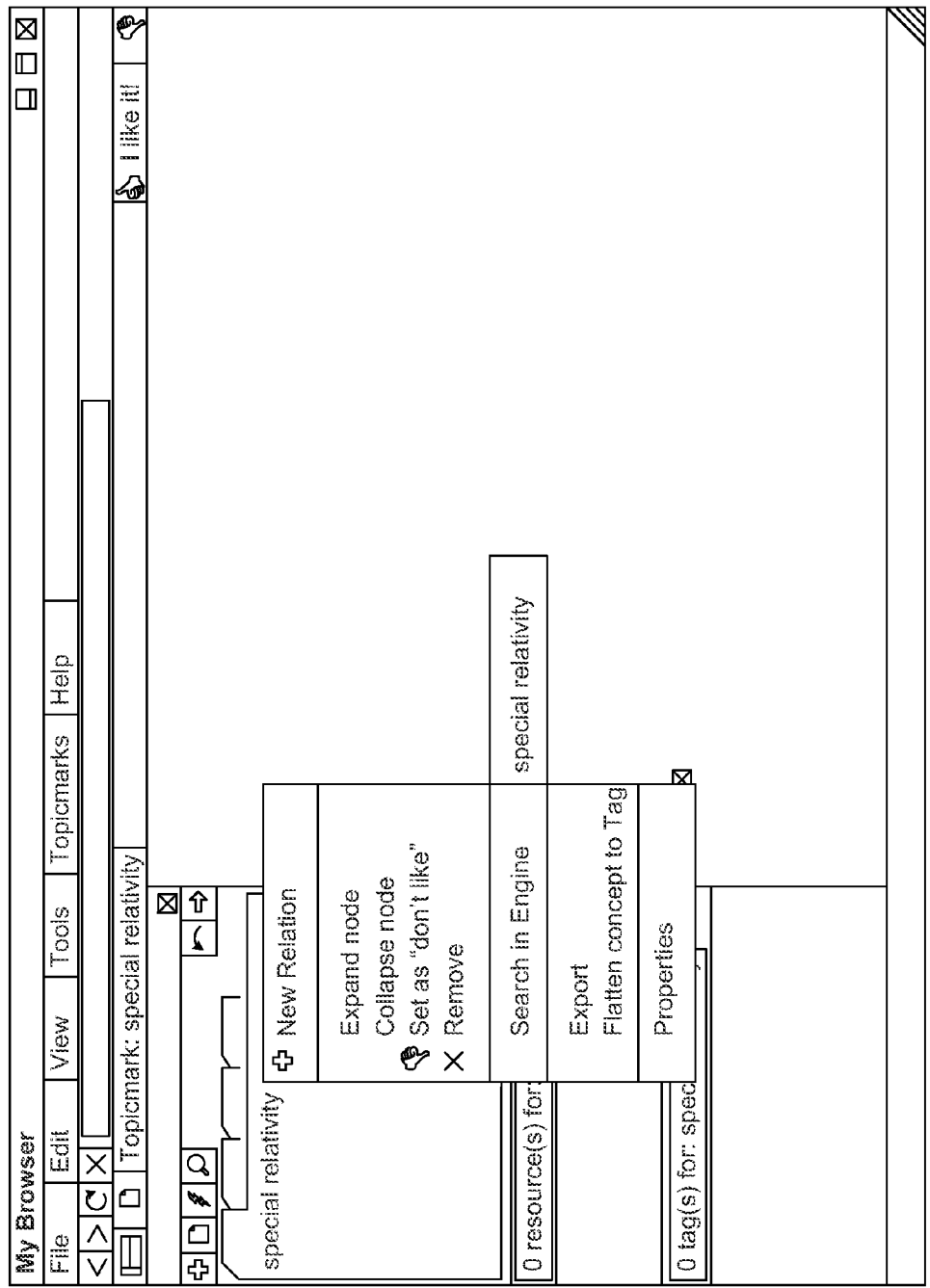

FIG. 8 illustrates how the user interface that allows personal knowledge (semantic network) based search phrases to be formulated for searching the Web via existing, publicly available search engines.

Figure 9:
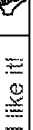

FIG. 9 further illustrates how the exemplary user interface connects personal knowledge construction and the Web. Search engine results (here of a search engine called "The Most Wonderful Search Engine") are measured by their relevancy to the semantic network that is representing personal knowledge.

Figure 10:
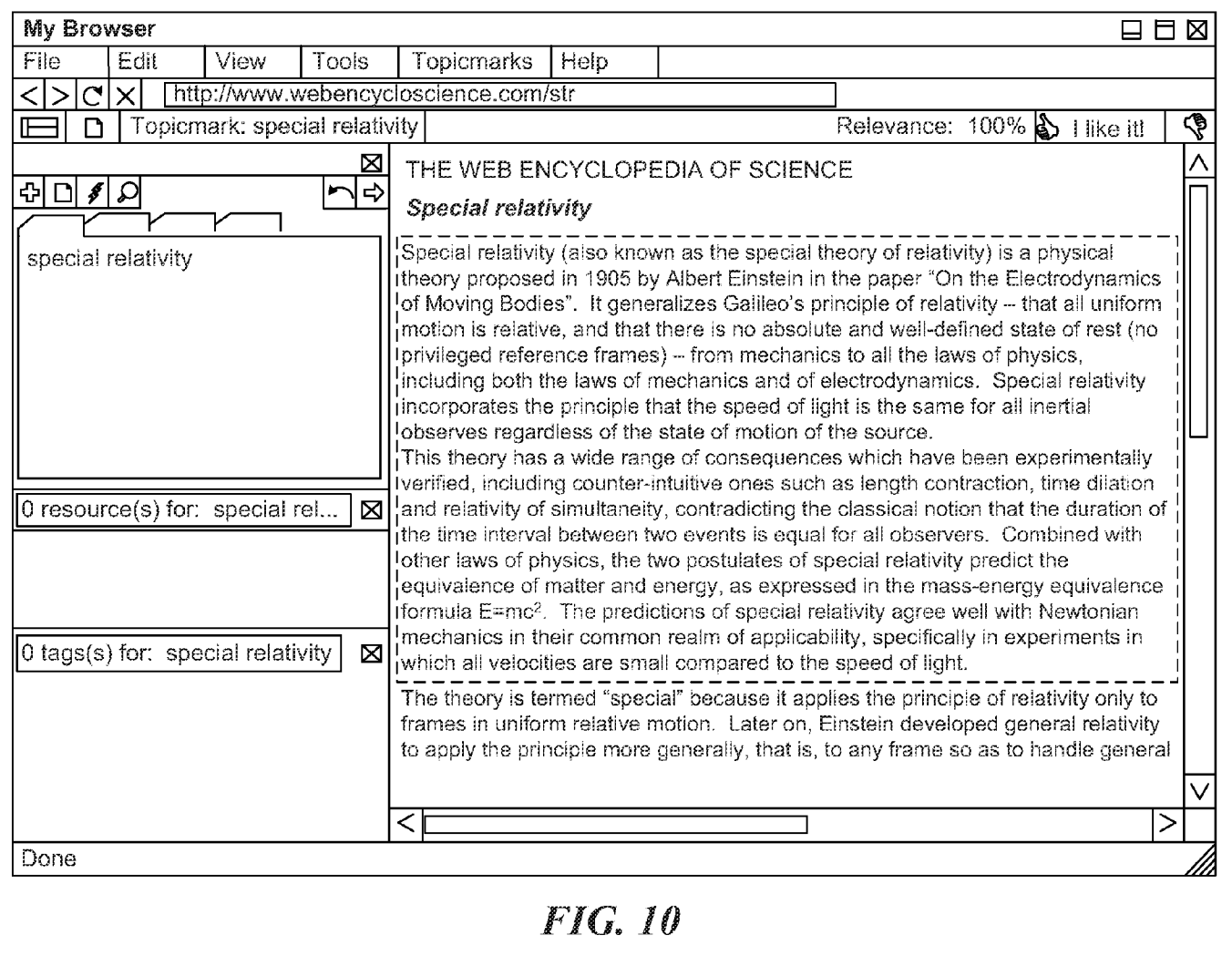

FIG. 10 illustrates how the user has the capability to select only that part of the web resource (page/document) that is of interest to personal knowledge construction. Selection of the entire resource is also possible. The exemplary user interface rates the relevancy of the page as a whole based on the semantic network of personal knowledge. The upper right icon in the menu bar is used to add the selected text as a personal knowledge resource (button "I like it") or to exclude it from further consideration.

Figure 11:
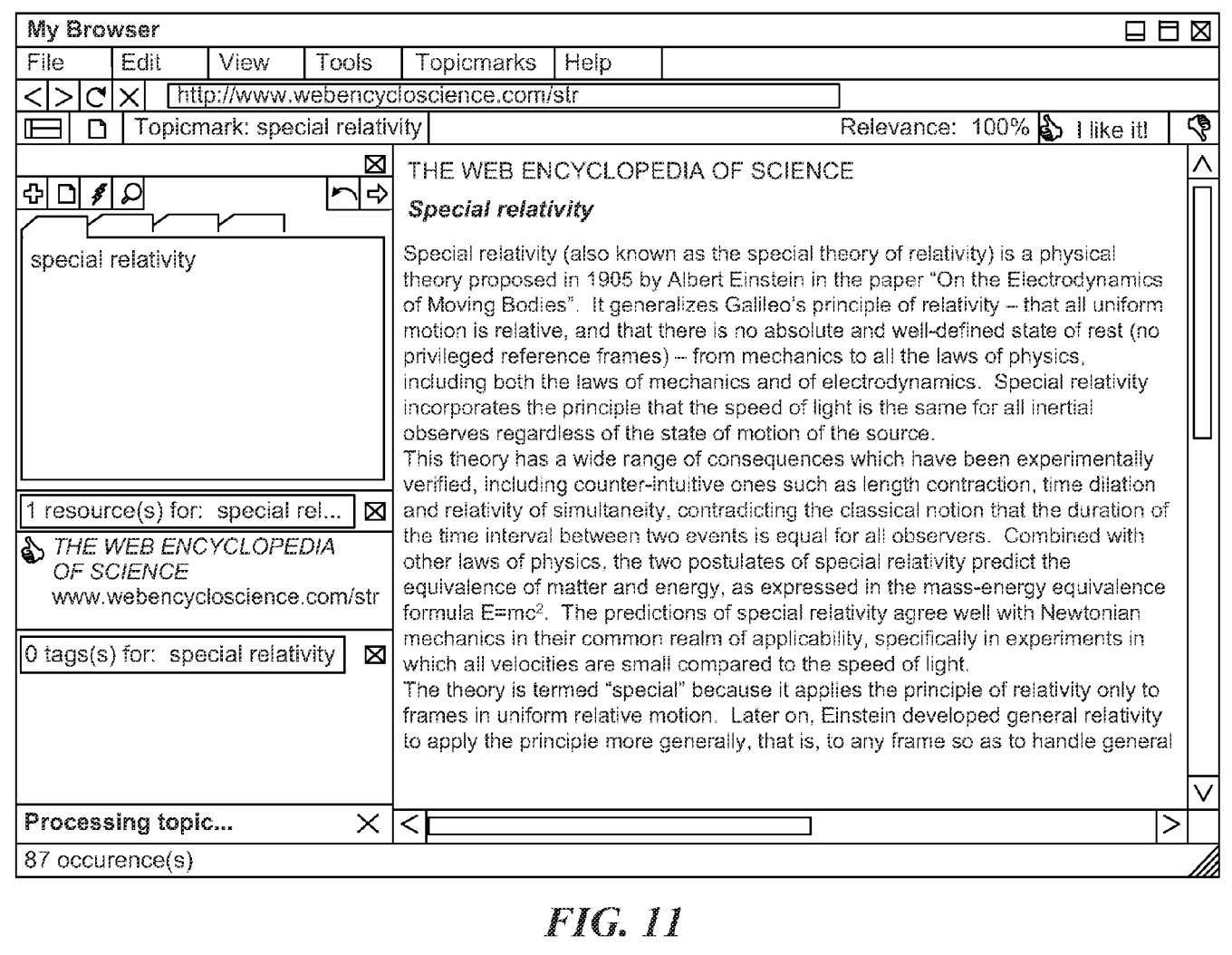

FIG. 11 illustrates the addition of a resource to personal knowledge by pushing the button "I like it!". The resource now appears in a resource list on the left side of the browser screen.

Figure 12:
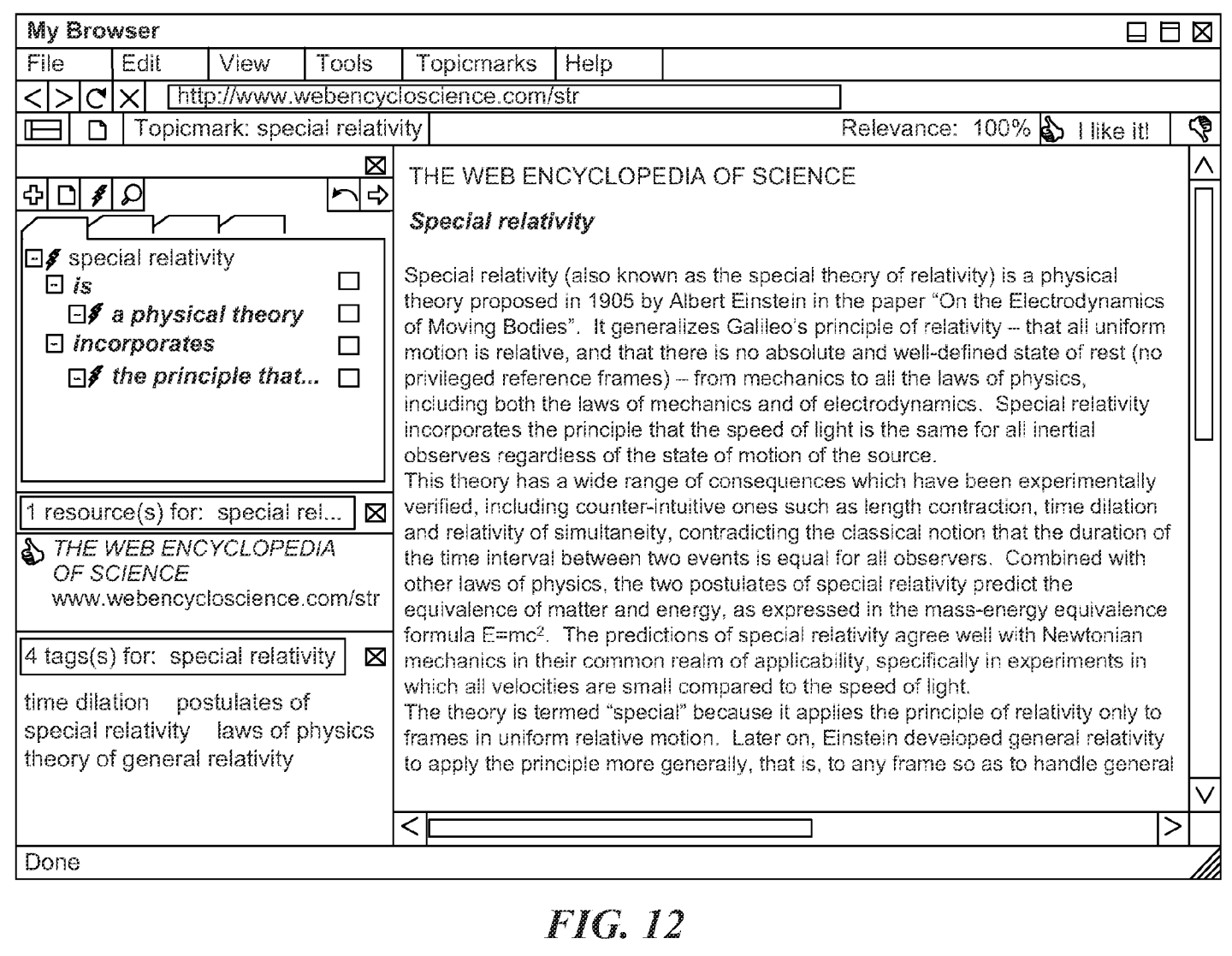

FIG. 12 shows, on the upper left side of the browser screen, a list of new propositions (concept-relation-concept) coming back to the user from the machine after the client has communicated with a server, the server being provided with a single node in the semantic network and a single resource reference to build personal knowledge. The user can select or reject each individual proposition or can accept or reject all propositions at once. Machine processing also returns tags or terms for each concept, displayed on the lower left side of the browser screen.

Figure 13:
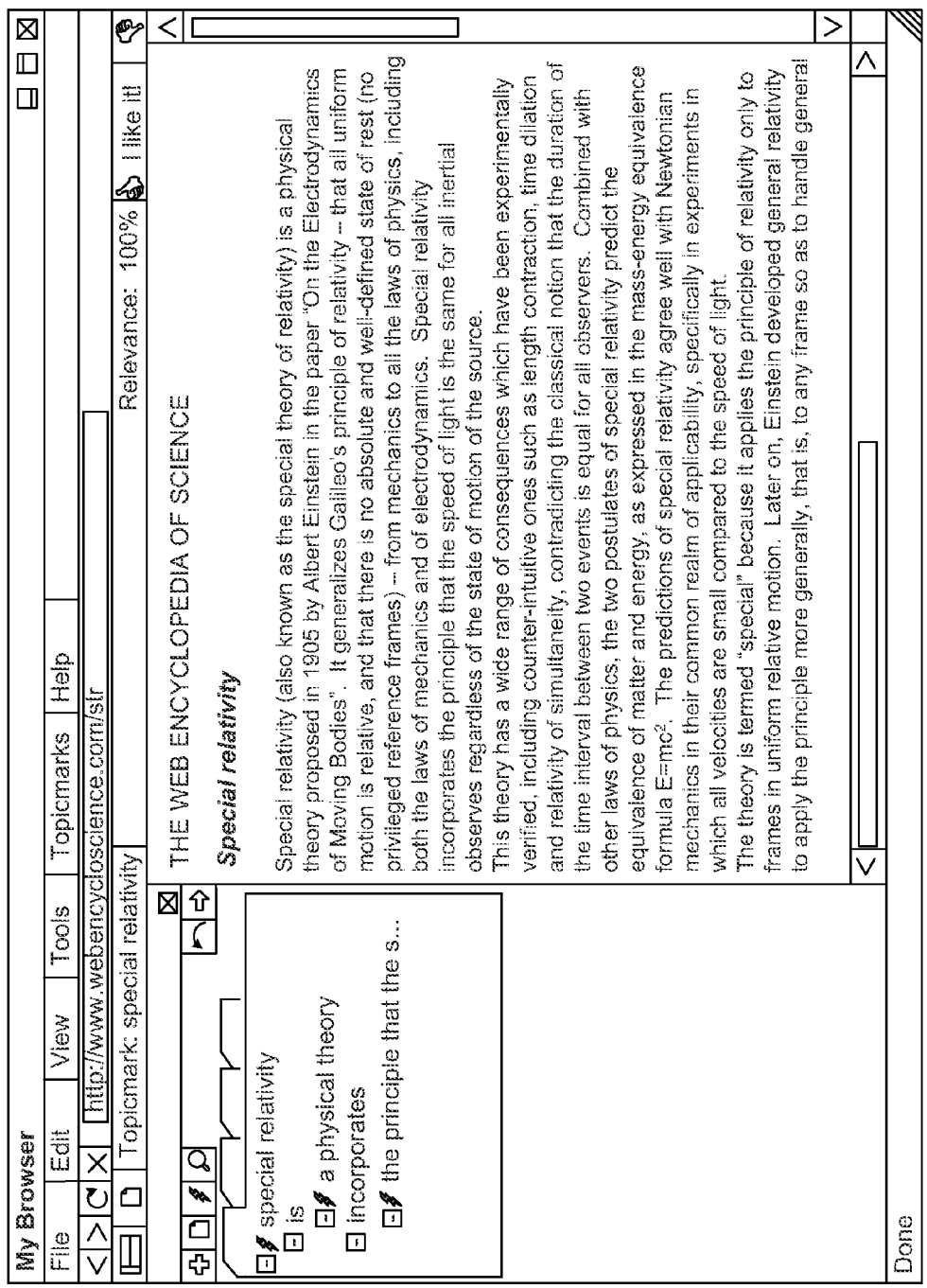

FIG. 13 shows the state of personal knowledge after one machine invocation, when starting with a single node in the semantic network and a single resource reference. Personal knowledge is represented by a concept map, a human friendly version of the semantic network. In this representation, resources and tags are hidden from user view, allowing the user to focus on concepts and their relations.

FIG. 14 depicts the results of new propositions generated by the machine after a second machine invocation.

Figure 15:
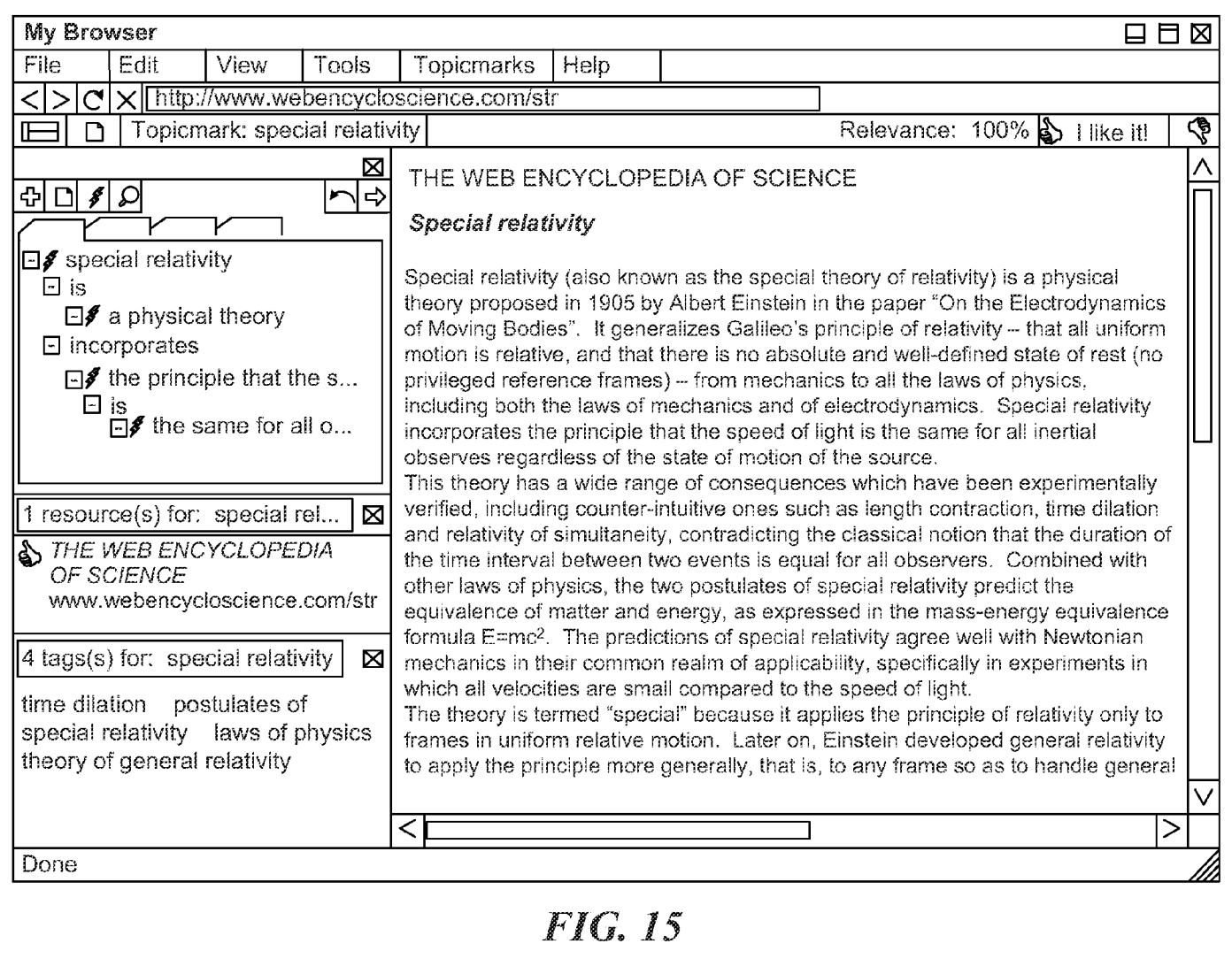

FIG. 15 shows the state of personal knowledge after the second machine invocation.

The above-described screenshots only illustrate the most basic steps of human-machine communication in this implementation of the present invention. However, the user has a variety of possibilities to further influence machine behavior and to obtain additional information.

In particular, it may be possible for the user to define and/or edit resource properties, such as resource title, resource weight (significance, e.g., from very useful or "I like it a lot" to totally useless or "I do not like it at all"), the URL of the resource, and/or the resource text. In addition, the user may view internal information such as an internal resource path, resource type, source (USER or MACHINE), a unique resource ID and resource timestamp. The user may also add comments for each resource. These functionalities may be implemented, e.g., through a pop-up window accessible through a context menu from the main browser screen.

Furthermore, the human-machine experience may be parameterizable by setting user preferences. This may, e.g., affect the display of elements with "unattractedness" (or negative affinity), display of relevance to search results, concept highlighting, selection of search engines, and the specification of export formats etc. In addition, a number of parameters which control or direct machine behavior, and subsequently the human-machine interaction experience, may be influenced by the user. In particular, the user can specify:

i. the identity of the machine using an URL;
ii. whether all machine proposals should be accepted (yes/no);
iii. the depth of new connections (from 1 to some predefined maximum);
iv. the maximum number of new connections (from 1 to some predefined maximum);
v. concept similarity threshold ("strict" or any lower level);
vi. the number of new resources that can be discovered by the machine (from 0 to some predefined maximum);
vii. a restriction on the maximum depth of relations (from 1 to some predefined maximum), whereby new connections are converted into a term set for existing concepts in the semantic network.

Furthermore, the user may have the possibility to manipulate concepts in the semantic network of personal knowledge. By the way of example, the user might be able to remove any concept, identify it as unattractive and not worth building on, collapse the concept into tags, and so on.

For each concept, there may be enriched metadata supporting the concept, some of which might be available to be modified by the user. Some elements of concept metadata include source (USER or MACHINE), weight or significance, unique identifier, user and machine comments, associated tags and context. Also tags may have metadata, some of which are user modifiable. Metadata directs machine behavior. Tags include source information (user or machine) and weight.

Instead of the manner shown in FIGS. 6-15, concepts may also be displayed in other appropriate manners, and the user may preferably select between such different display options. As an example, the user might choose to see concepts with incoming and outgoing connections and assigned weights. All columnar information may be available to be sorted in order to work effectively with concepts. Alternatively, the semantic network might be displayed as a set of propositions, i.e. concept-relation-concept triples. The semantic network may also be displayed without relations, thereby generating a form of conceptual hierarchy. Concepts are then complemented (only) by user and/or machine generated tags.

The user interface may also allow the human to create a new semantic network from a concept in an existing semantic network by extracting any concept to a new "topicmark". This will set the so-identified concept as the root of the new semantic network and cause said concept to be highlighted appropriately when the original semantic network is displayed. Instead of a concept, also a tag can be elevated as a root concept in a new semantic network of personal knowledge.

Each semantic network established in this manner may be exported in different formats or representations, e.g. in a configurable HTML format, for external use.

From the above description, it will be apparent that the invention is not restricted to the above-described preferred embodiment, and that a large number of other embodiments are possible.

In the following, a summary of some key aspects of the preferred embodiment is given.

A. Human-Machine Interaction

The present invention addresses the info-glut problem from a personal not a collective or shared perspective; to use semantic networks to enable human-machine interaction; to premise the dynamics of the system from the human side on concept map theory and the ability of the machine to work within this setting; to reduce the burden of formalism by using "open information extraction" techniques on Web documents rather than the information extraction approach marked by Message Understanding Conferences; to expand and annotate personal knowledge by harnessing the intelligence of the Web; to automate the process of conceptualization through knowledge and intents defined by the user.

B. Personal Intellectual Capital

For the user, the benefits of human-machine cognition towards the construction and expansion of personal knowledge are many. Most importantly, semantic networks wrapped as concept maps are a succinct way to express knowledge. They contribute to not only "meaningful learning" but are also instrumental in idea generation and creativity. This is of great consequence to the knowledge worker, who, to stay competitive, is required to constantly replenish and increase his or her "intellectual capital". With the assistance of a machine, the user is now able to extract relevant conceptual structures, succinctly formulated as concept maps, from an immense volume of information. The machine, drawing upon the "wisdom of the crowd" richness of the Web, relieves the user from the manual effort of identifying and annotating the significant concepts and their relationships, and the implications of concepts not quite apparent in unstructured data. This is no small advantage for the user, because much time and effort is wasted in note taking when the significance of what to note is not apparent until much of the information has been processed.

C. Growing Intellectual Capital

An increase in personal intellectual capital with a reduced expenditure in time and effort is not the only benefit. Semantic networks is an underlying technology that supports more advanced knowledge representation schemes, as RDF supports the Semantic Web. Hence, semantic networks are not only useful for representing personalized, idiosyncratic knowledge, but also for preparing the way towards the integration of personal knowledge into more formal knowledge schemes, like ontologies, in whole or in part. In such a manner, personal and collective intellectual capital could merge to the mutual benefit of each. This would be particularly true within the corporate enterprise.

D. Personal Knowledge

In contrast to prior-art approaches, the present invention focuses on personal knowledge:

i) this personal knowledge is exchanged between human and machine as a semantic network (the semantic network is not used to build a knowledgebase to support "Who-What-Where-When-Why-How" queries against documents);

ii) documents and their selections are not the central focus of the present invention but simply the raw material from which machines can posit new personal knowledge;

iii) personal knowledge construction is a collaboration between human and machine, whereby users influence the direction and volume of knowledge acquisition;

iv) access to various Web resources are used to help determine what concepts are significant to the semantic network that is representing the user's personal knowledge;

v) the semantic network representing the user's personal knowledge, once it is created in a process of human-machine interaction, is an entity that is abstracted and independent of the original unstructured text.

Furthermore, in contrast to prior art, the present invention:

i) relies upon semantic networks as a form of knowledge representation that is both human and machine understandable ii) uses a model of learning and creativity based on concept map theory to enable an inductive and deductive discovery system through semantic networks iii) always starts with a root concept iv) uses semantic networks to represent personal knowledge as opposed to personal information v) exploits semantic networks as a way integrate with more formalized expressions of knowledge, such as ontologies vi) formulates the increase and replenishment of personal knowledge as a joint collaboration between user and machine vii) defines a pattern of human-machine interaction based on semantic metadata viii) distinguishes between human and machine generated concepts ix) weights concepts according to significance assigned by either human or machine x) annotates concepts with comments and folksonomic tag clouds generated by human and machine xi) uses open information extraction as opposed to MUC-style approaches in order to generate of concept-relation-concept triples without a predefined model xii) defines a process of conceptualization that harnesses Web intelligence to create new knowledge xiii) references documents and text selections as raw material from which humans and machines can posit new personal knowledge, but does not make documents the central focus xiv) infers context from the personal knowledge represented by the semantic network, not the document set xv) because concept-relation-concept triples are generated by a conceptualization process, does not need to have an a priori model xvi) is not concerned with identifying all concept instances in a document, nor annotating documents xvii) does not use phrase triggers that are resource-context specific It is clear that semantic networks, whether as concept maps or topic maps, are capable of capturing rich conceptualizations, thereby underpinning knowledge management and contributing to intellectual capital. Various aspects of novelty of the present invention relate to the use of semantic networks in human and machine collaboration to acquire knowledge. The core realization is that knowledge acquisition for personal knowledge has boundaries and dynamics that are different for shared or common knowledge, that knowledge at a fundamental level has no absolutes but is an ever-evolving network of relationships. The aspects of novelty of the present invention when compared to other systems in this domain, such as EXTENDER (EXtensive Topic Extender from New Data Exploring Relationships, see Leake, D. B., Maguitman, A., Reichherzer, T. (2003): Topic Extraction and Extension to Support Concept Mapping, Proceedings of the Sixteenth International Florida Artificial Intelligence Conference (FLAI RS), St. Augustine, Fla., AAAI Press) stem not only from the human-machine dialogue and enriched semantic metadata for semantic networks but from open information extraction techniques that cull concepts and their relations from Web documents to the use of the Web beyond the invocation of search engines, specifically application programming interfaces which make the collective intelligence of the Web accessible.

VARIATIONS AND FURTHER EMBODIMENTS

Variations of embodiments and further embodiments of the present invention are described herein below with reference to FIGS. 16 to 24. Such variations and further embodiments relate to post-Gutenberg tools for enhancing and capturing the user reading experience. In particular, a system for generating a document representation, the system comprising a server and a client computer, includes: means for receiving as user input into a memory of a system a resource containing at least one sentence of text information; means for producing in response to each of the at least one sentence a system-storable tree comprising a plurality of tree elements and grammatical relations between the tree elements, each of the tree elements indicating a part-of-speech contained within the each sentence; means for producing in response to each of the trees one or more semantic structures such that each of the semantic structures comprises three of the tree elements selected by the system such that the each semantic structure represents a simple clause associated with the each tree; and means for storing in the memory the one or more semantic structures in association with one or more connections between common ones of the tree elements, thereby generating a set of one or more semantic networks representing the resource. The system may further include means for modifying the set of one or more semantic networks in response to user input; means for automatically determining a further resource; means for producing each of a concept map, facts listing, a text summary, a tag cloud, an index and an annotated text; and means for producing a document use history.

Figure 16:
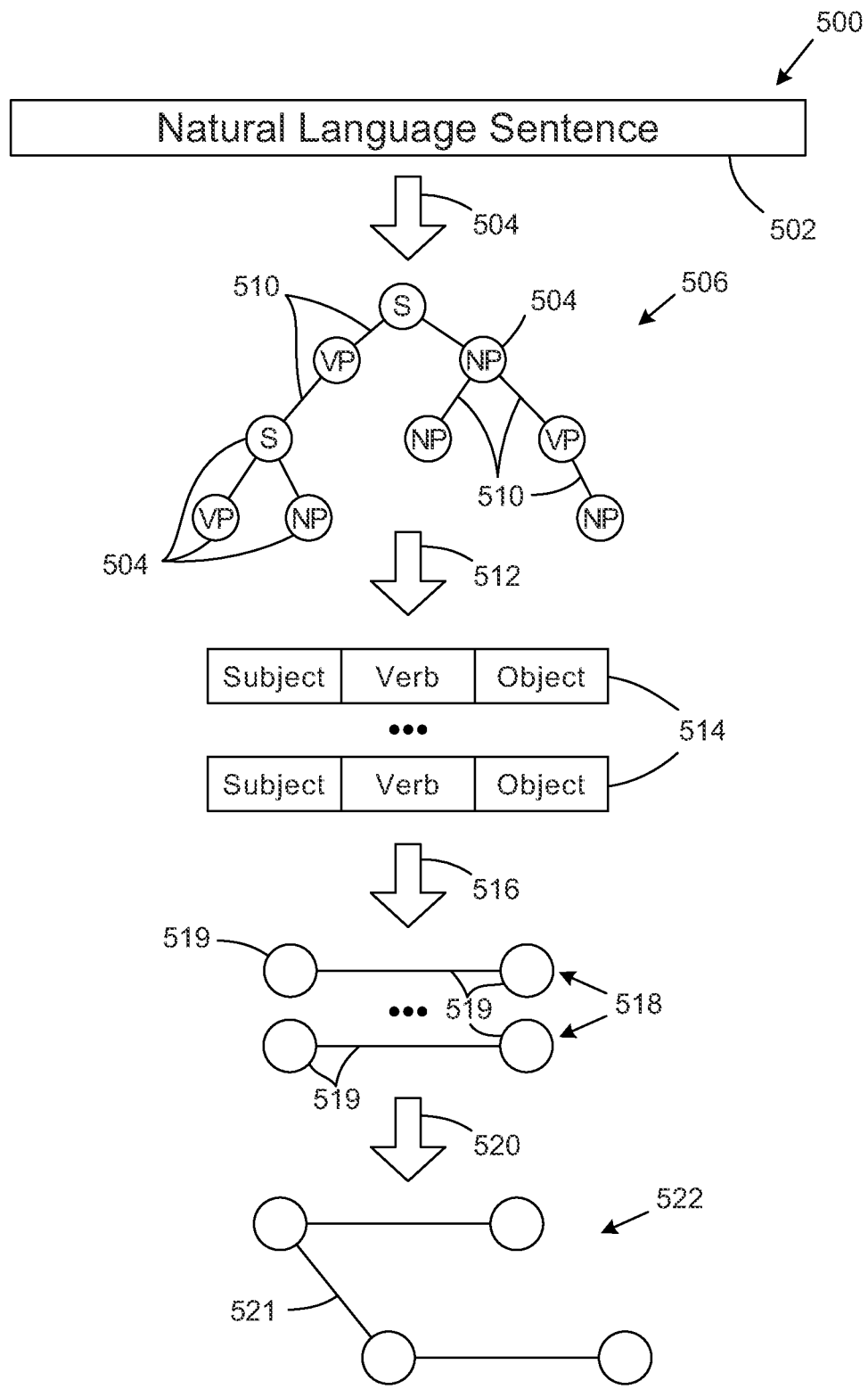
FIG. 16 is a flow diagram of a method according to an aspect of the present invention of transforming a natural language sentence to a RDF graph.

FIG. 16 illustrates how unstructured text can be transformed into structured data using advanced information extraction techniques. Specifically, executing method 500 transforms a natural language sentence 502 into a RDF graph 522 (described further herein below). The method 500 is executed by a system which includes the client 201 (FIG. 2) and the server (202, 203, 204 of FIG. 2). Except where otherwise specifically stated, steps of the methods described and illustrated herein executed by the system may be executed at the client 201, at the server 202 to 204, or both at the client 201 and at the server 202 to 204. For ease of description, the illustrated RDF graph 522 is relatively rudimentary. However, RDF graphs 522, documents 524 (described further herein below) and semantic networks 523 (described further herein below) of any size or complexity is within the scope contemplated by the present invention.

Prior to executing step 504 of the method 500, the system is operable in at least some embodiments to receive as input unstructured text which includes one or more natural language sentences 502 and/or information expressible as one or more natural language sentences 502. In such embodiments, the method 500 includes processing the submitted information to separate presentation information thereof from content thereof in the form of one or more natural language sentences 502. The method 502 further includes producing a sequential ordering of sentences 502, and producing metadata collected from presentation markup (for example header information, font information, hyperlinks) associated with the sentences 502. The entire set of sentences 502 is submitted to a program module entitled a Named Entity Coreferencer, whereby executing this program module causes the system to identify related noun terms in the body of the document or other submitted information.

As shown in FIG. 16, step 504 includes using natural language processing techniques to construct a syntax tree 506 from the natural language sentence 502. The syntax tree 506 includes exemplary nodes 508 representing various part-of-speech constituents defined in accordance with a specifiable annotation scheme. For example, FIG. 16 illustrates the abbreviation "S" representing clausal parts-of-speech, "NP" representing a noun phrase part-of-speech, and "VP" representing a verb phrase part-of-speech. The links 510 represent grammatical relationships between pairs of connected nodes 508. In at least some embodiments, the syntax tree 506 is or forms part of a Penn Tree Bank, which is a term generally known in the art to refer to a collection of syntax trees such as the syntax tree 506. The construction of the syntax tree 506 in step 504 may involve known approaches and algorithms, in conjunction with novel aspects of the present invention described and illustrated herein. In general, the system is operable to produce one or more syntax trees 506 in response to each natural language sentence 502.

The transformation of the natural language sentence 502 to the syntax tree 506 by step 504 precedes the step 512 in which, in particular exemplary instances, involves converting a complex sentence 500 comprised of multiple clauses into a number of simple clauses 514, including where subjects and/or objects are determined by the system to be the same.

At step 512 in FIG. 16, in general the system converts the syntax tree 506 into a set of simple clauses 514, by using natural language techniques and graph traversals, which in typical circumstances may be complicated graph traversals. It is generally considered in the prior art to not be possible to derive simple clauses without there being a machine understanding of the part-of-speech constituents of a sentence. As shown in FIG. 16, each simple clause 514 consists of three elements: subject, predicate (or verb phrase) and object.

In step 516 of FIG. 16, the simple clauses 514 are converted into semantic relations, such as the RDF (Resource Description Framework) statements 518. Each RDF statement 518 consists of three elements: a subject, predicate (or verb phrase), and object. These three elements together may also be referred to as a CRC (concept-relation-concept) triple, a RDF triple, subject-verb-object, semantic relation, and other related terms. The RDF graph 518 shown in FIG. 16 includes RDF elements 519. Step 516 preferably includes storing the RDF graphs 518 in memory of the system, such as by storing the RDF graphs 518 in a database of the system. Storing the RDF graphs 518 preferably includes storing related metadata in association with the RDF graphs 518. Metadata is expressed as a semantic relation that in turn operates on a semantic relation. The step of producing metadata may be referred to as reification, which step may be performed in accordance with the prior art.

In at least some embodiments of the present invention, executing step 516 includes performing a process of pronominal anaphora resolution to determine semantic relations between pronouns and contextually related antecedents. Preferably, performing the process of pronominal anaphora resolution is in conjunction with results obtained from Named Entity Coreferencing. Executing step 516 further includes in some embodiments determining by morphological analysis of the system the base form of each word in each simple clause 514, and determining by the system a set of synonyms, such as semantic meaning synonyms for example, associated with each word in each simple clause 514.

The RDF statements 518 facilitate a process of conceptualization 520, whereby concepts of sufficient semantic similarity are identified by the system as being common. Conceptualization algorithms of embodiments of the present invention can be based on an existing model of knowledge, on various taxonomies or dictionaries, the use of subsumption when invoking ontological knowledge, symbol or string comparison, other similar techniques or any combination thereof, for example. Conceptualization may or may not include a priori knowledge of various levels of sophistication and complexity. The conceptualization process is based on an estimation of semantic similarity between various subjects, various objects, and between the various subjects and objects associated with the RDF statements 518. The result of step 520 is a RDF graph 522, which may be considered to have the form of a semantic network. By way of example, the two RDF statements 518 shown in FIG. 16 are connected by connections 521 at their respective RDF elements 519 representing their respective subjects to form the RDF graph 522 shown in FIG. 16.

Still referring to FIG. 16, the system is operable to produce one RDF graph 522 for each natural language sentence 502 of the document 524. Furthermore, the system is operable to repeat steps 504, 512, 516 and 520 for each natural language sentence 502 of the submitted information.

Figure 17:
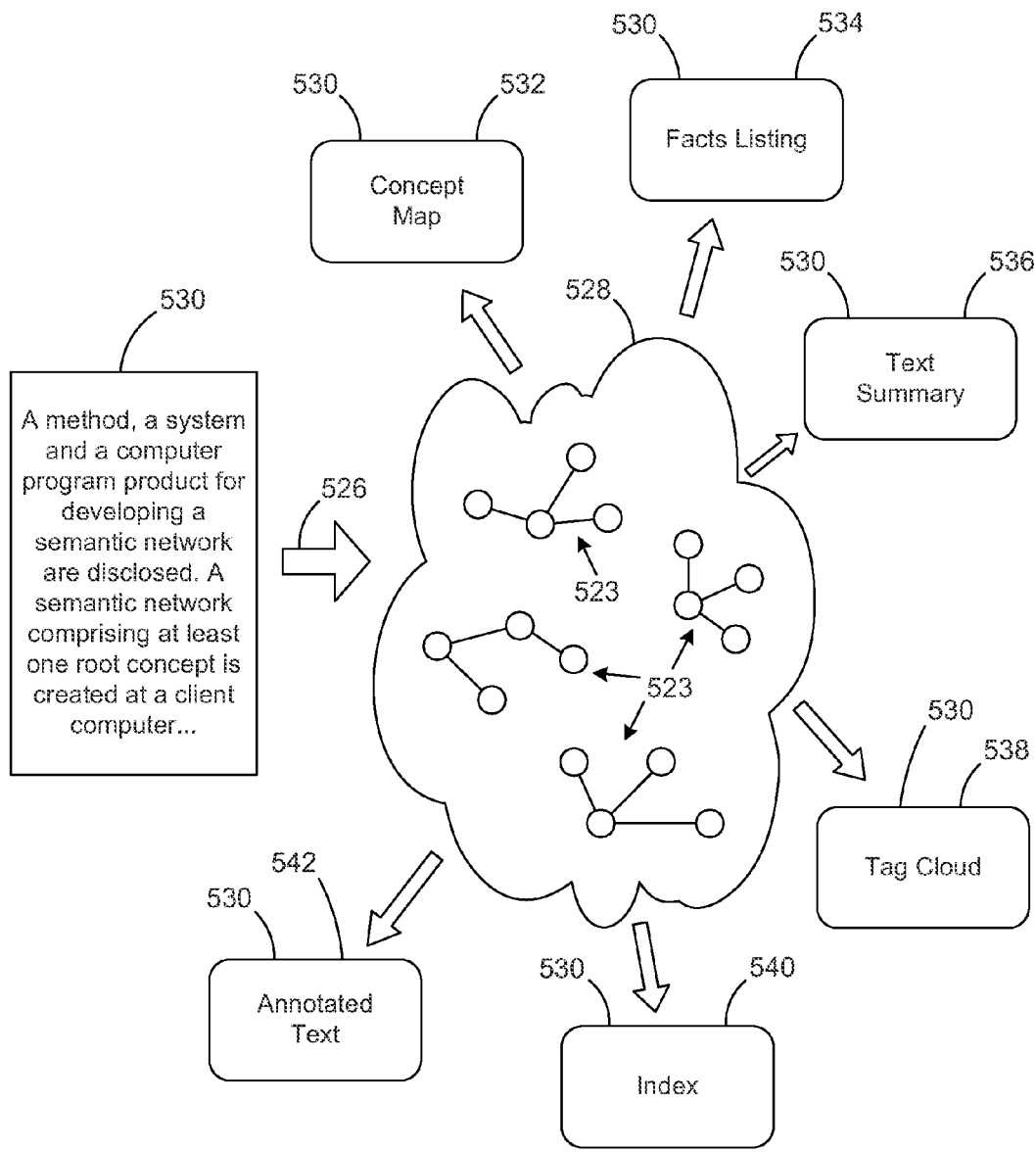
FIG. 17 shows output representations of a document the system of the present invention is operable to present in response to a set of semantic networks produced in response to the document.

FIG. 17 illustrates an exemplary application of the method 500 (FIG. 16) to a document 524. The document 524 typically includes a number of natural language sentences 502 (FIG. 16), but may include any arbitrary piece of information such as unstructured text submitted to a program or set of programs running on one or many machines of the system. This piece of information includes but is not restricted to complete or partial electronic documents, in any format, an image or voice print that can be transcribed to text, other similar sources of information consisting of or expressible as at least one natural language sentence, or any combination thereof for example. The process or method 526 transforms the document 524 content into a collection or set 528 of semantic networks 523.

Still referring to FIG. 17, the system is operable to form connections (or links) between RDF elements 519 associated with different RDF graphs 522 so as to produce a number of semantic networks 523. For example, the system is operable in at least some embodiments to determine semantic similarity between RDF elements 519, and to produce connections between common RDF elements 519 having sufficient semantic similarity therebetween. For a typical document 524, the number of semantic networks 523 is less than the number of RDF graphs 522 associated with the document 524 and the average size of each semantic network 523 is typically larger than the average size of the RDF graphs 522, for example.

By way of example relating to FIGS. 16 and 17, if the natural language sentence 502 is "Einstein was a theoretical physicist and an author", step 512 of the method 500 results in a first simple clause 514 consisting of the subject "Einstein", predicate "was" and object "a theoretical physicist"; and a second simple clause 514 consisting of the subject "Einstein", predicate "was" and object "an author". A first RDF statement 518 represents, as RDF elements 519 using RDF notation, the subject "Einstein", predicate "was" and object "a theoretical physicist"; and a second RDF statement 518 represents, as RDF elements 519 using RDF notation, the subject "Einstein", predicate "was" and object "an author". The subject "Einstein" is common to both RDF statements 518 and therefore connected by executing step 520 of the method 500 to produce the RDF graph 522 in which respective subjects of the first and second exemplary RDF statements 518 are connected by the connection 521. Continuing this example with reference to FIG. 17, the document 524 may, by way of example, include the sentence 502 and a further sentence "Theoretical physicists employ mathematical models to explain natural phenomena." The subject of this further sentence (namely, "Theoretical physicists") is in common with the object-type RDF element 519 of the first exemplary RDF statement 518 associated with the sentence 502 in this example, and thus are connected by executing step 526 to form a single semantic network 523 larger than the first exemplary RDF statement 518 alone. In at least some embodiments, it is not necessary for two RDF elements 519 to be identical for such RDF elements 519 to be common such that a connection 521 is made therebetween. The system is operable to make a connection 521 in accordance with a probability of correctness. To do so, the system is operable to select two RDF elements 519; associate semantic metadata, such as semantic metadata identifying a "same as" type relationship, with the two RDF elements 519; determine a probability of similarity of the "same as" relationship; determine whether such probability of similarity is equal to or greater than a threshold; and to create a connection between the two RDF elements if the probability of similarity is equal to or greater than the threshold. The threshold is user controllable such that user input received from the user can vary the value of the threshold from a default value, thereby advantageously providing interactivity. Further connections may further enlarge this single semantic network 523 and other semantic networks 523 illustrated in FIG. 17. In accordance with the present invention, small semantic networks 523 can be connected with other semantic networks 523 to form larger semantic networks 523.

Still referring to FIG. 17, the result of conceptualization processes by the system at the step 526 (including in some embodiments steps of the method 500 of FIG. 16) is the set 528 of semantic networks 523 for the document 524. This set 528 may be thought of as many small islands of connected RDF statements 518 (each island forming a semantic network 523) for any given document 524. The number and sizes of the semantic networks 523 in the set 528 of semantic networks 523 is dependent on the particular content of the document. Furthermore, the system is operable to apply the method 500 to each sentence 502 in the document 524. Since the document 524 includes a collection of natural language sentences 502, the method 526 is shown in FIG. 17 as including the method 500 of FIG. 16 and also including the step of constructing the set 528 of semantic networks 523 (each semantic network 523 being formed by inter-connecting semantic networks 522) produced on the basis of the content of the document 524. These semantic networks 523 represent the result of a transformation of unstructured text (i.e. the content of the document 524) to a well-defined data structure (i.e. the collection 528) composed of the semantic networks 523. The set 528 serves as a form of knowledge representation associated with the document 524.

The set 528 of semantic networks 523 can be used by the system to construct any one or more of a multiple number of output representations 530 of the document 524 content. This allows the original text of the document 524 to be reconstituted into different, multivariate forms. In some embodiments, the system is operable to construct different output representations 530 by executing graph-theoretic algorithms. In such embodiments, the system is operable to produce the output representations 530 such that each output representation 530 advantageously enhances the user reading experience, thereby advantageously facilitating the acquisition and expansion of personal knowledge. There are many different kinds of output representations 530, including but not restricted to the: concept map 532; facts listing 534; text summary 536; tag cloud 538; index 540; and annotated text 542. In some embodiments, the system is operable to produce multi-media presentations (not shown). The facts listings 534 includes in at least some embodiments weighted facts, searchable facts, linked facts, and any combination thereof including facts which are weighted, searchable and linked. The summaries 536 are user configurable, allowing for the specification of a topic of interest for the summary, the strictness with respect to said user-defined topic of interest, the size of the summary and so on. The index 540 is in some embodiments presented in a back-of-the-book style, whereby each index entry is associated with a set of semantic relations. The annotated text 542 is in some embodiments includes the highlighting and mouseover annotation of original text based on the semantic networks derived from the document and the semantic networks derived from user input. 542. The selection of each output representation 530 is user controllable.

The system in at least some embodiments is operable to present the output representations 530 at the client computer, thereby advantageously facilitating interactive processes for human-machine collaboration in the generation and modification of semantic networks. The system is operable in such embodiments to receive user input specifying a user selection of a particular output representation 532 to 542.

The respective methods of constructing each output representation 530 differ from each other, and the results of performing each method of constructing each output representation 530 differs. Preferably, however, each of the methods of constructing a respective output representation 530 for a given document 524 involves system processing of a common data structure, namely the set 528 of the semantic networks 523. Because the underlying data structure (i.e. the set 528) is the same for any given document 524, the different perspectives afforded by each output representation 530 for a given document 524 are advantageously mutually reinforcing. Each new output representation 530 of a document 524 is mutually complementary and connected. Stated otherwise, the user experience with respect to each document 524 output representation 530 is aggregative such that the user experience with respect to one document 524 output representation 530 can advantageously enhance the user experience with respect to a subsequent document 524 output representation 530, thereby advantageously facilitating efficacy of human effort to comprehend the document 524 content. Of the many document 524 output representations 530 possible, it is the user that defines which subset of output representations 530 to experience at any given time. These decisions can be based on user biases, the breadth and difficulty of document content, reading objectives, etc., and other human factors or any combination thereof, for example. The different output representations 530 advantageously facilitate reading efficiency and comprehension by the user. Each output representation 530 advantageously permits a style of reading selectable the user according to the user's information needs.

The system is operable to execute one or more user interface program modules, such as executing one parameterized user interface in respect of each output representation 530. The functionality of the system permitting the user to control by user input (including user input specifying selections of output representations 530 and parameter values) the selection and presentation of each output representation 530 advantageously provides means of determining user intention (as represented by the user input), and advantageously provides means of distributing and incorporating this knowledge into machine intelligence.

Each output representation 530 of a document 524 advantageously provides its own unique facility for permitting the user to personalize the user's reading experience. The control given to the user by executing user interface modules of the system can include but are not restricted to searching, navigation via key concept hyperlinks, specification of user defined topics of interest, selecting various lengths and keyword associations of document summaries, slidebars to control information coverage by specifying system parameters, drilling down into unstructured text to find context, and others.

By way of example in respect of some embodiments of the present invention, presenting to a user the concept map 532 includes presenting to the user one or more proposed facts and prompting the user to accept or reject the presented proposed facts. The system is operable to receive as user input the user's selection of acceptance or rejection of each given proposed fact, and to modify the set 528 of the semantic networks 523 in accordance with such user selection. In at least some embodiments, the system is operable to receive as user input a weight for associating with a proposed fact. For example, the weight may be expressed as a number between −1 and 10, where −1 indicates user rejection of the proposed fact and any positive number in the permitted range represents user acceptance of the proposed fact, with 10 representing a greatest level of acceptance.

In some embodiments, a concept map 532 is a document representation of a semantic network of personal knowledge. Of all the various document representations, the concept map 532 is the one which most explicitly reveals semantic relations. Personal semantic networks may refer or connect to other semantic networks. In particular, a personal semantic network will make connections to semantic networks derived from a document 524. These connections are themselves expressed as semantic relations. Some semantic relations will be statements about other semantic relations, thereby creating what may be referred to as metadata. Semantic metadata of this form allows for the accreditation of every element in the semantic network, thereby making it possible to identify what is unique personal knowledge and what is the semantic network of a document 524, which may be a public domain document 524.

In variations, the system is operable to provide further user interfaces and related functionality, including user interfaces and functionality permitting a user to edit system-generated semantic networks (e.g. edit one or more semantic networks 523 by accepting and/or rejecting proposed facts presented in a concept map 532) and user interfaces and related functionality permitting a user to create their own semantic network 523 (such as by direct user input). Such human-machine collaboration features advantageously facilitate the construction by the system of semantic networks 523 that are more complete, more connected, more refined, or any combination thereof, than otherwise would be absent such human-machine collaboration features.

Figure 18:
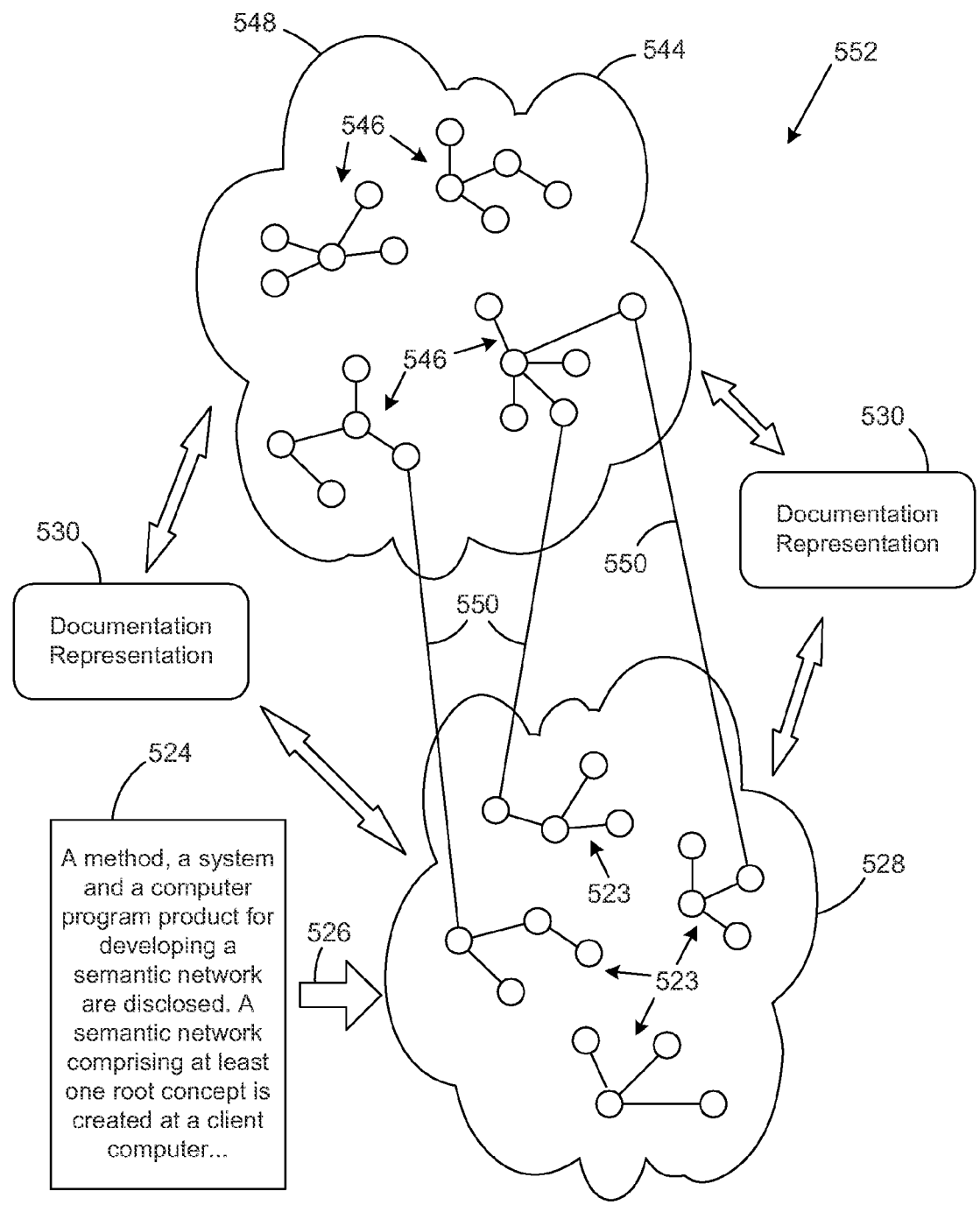
FIG. 18 shows a personal semantic network connected to the set of semantic networks shown in FIG. 17.

FIG. 18 reiterates the advantageous aspect of the present invention shown in FIG. 17, including that document 524 content can be represented by a set 528 of semantic networks 523 and that this underlying data structure (i.e. the set 528) can support many different output representations 530 of the document 524 content. For ease of description, the set 528, which is produced by the system on the basis of the document 524, is also referred to herein as a document semantic network 528.

An advantageous aspect of the present invention is that each of the various document 524 output representations 530 can serve as an exposition of knowledge extracted from document 524 content. Collectively, these output representations 530 comprise a toolset of exploration for the user, which is based on the ability of the system to represent knowledge and to have this system knowledge modified and augmented by personal knowledge extracted from human actions. The ability to integrate human and machine knowledge advantageously results from an exchange of information, where such information is represented by semantic networks 523. The system is operable in some embodiments to connect any number of the semantic networks 523 by the connections 550 to any number of the semantic networks 546, thereby creating larger "islands" of semantic networks.

FIG. 18 depicts human interaction with document 524 output representations 530 being captured as a set 544 of semantic statements 546. The semantic statements 546, which are produced in response to user input commands, have the same or otherwise compatible form as the semantic networks 523, which are produced in response to natural language sentences 502 (FIG. 16). Stated otherwise, user interaction is captured as knowledge using semantic networks 546. The semantic networks 546 are typically of less complexity than the semantic networks 523. The system of the present invention is operable to process the semantic networks 546 in the identical, analogous or otherwise similar manner as the system is able to process the semantic networks 523. For a given document 524, the various document 524 output representations 530 are all based on the same underlying data structure (i.e. the set 528), and the method and system of the present invention is operable to create semantic connections between the semantic statements 546 associated with the document 524 and the semantic networks 523 associated with the document 524. Given the fundamental nature of RDF, where all elements of an RDF assertion are identified by a URI (Uniform Resource Identifier), the set 544 of personal semantic statements 546 may be referred to as a personal semantic network 548 of the user. A personal semantic network 548 in at least some embodiments generally includes semantic relationships 550 between zero or more semantic statements 546 and zero or more document semantic networks 528. Semantic statements 546 may or may not include statements about the statements in the semantic network set 528 of the document 524.

The methods of constructing the document 524 output representations 530 in at least some embodiments involve, though are not limited to, the execution of graph-theoretic algorithms that operate on the set 528 of semantic networks 523 and the set 544 of semantic statements 546. The set 528 of semantic networks 523, the set 544 of semantic statements 546, and the semantic relationships 550 there between associated with a given document 524 may be considered itself to be a semantic network 552. Every human interaction with these document 524 output representations 530, such as by receiving as user input a request for a specified output representation 530 and zero or more related parameters, can advantageously have the result of enlarging the semantic network 552. The semantic network 552, when viewed as one, may therefore be referred to as an aggregation of document knowledge and personal knowledge. The system in at least some embodiments is operable to connect personal semantic networks 548 with document semantic networks 528 to create personal semantic networks 548 on documents such as the document 524.

The functionality of the system permitting the user to navigate between different document 524 output representations 530 and the personalization associated with each output representation 530 advantageously facilitates forms of user interaction with the document 524 content not possible with the original document 524 absent this system functionality. These new forms of document interaction are not only unique but also advantageously provide a detailed indication of which parts of the document 524 content the user is actually reading. Because each output representation 530 of the document 524 is derived from the same structured data (e.g. set 528, semantic network 548) based on the original text of the document 524, the reading experiences (from the various output representations 530) are aggregative. For example, the reading experiences can be captured by recording user input and output representations 530 associated with a given document 524, and interpreted as operating on the document's underlying structured data.

The personalization of the document semantic network 528 by the system (by constructing the connections 550 between the document semantic network 528 with the personal semantic network 548 fashioned from the user reading experience associated with the different output representations 530) advantageously provides for the construction of more relevant, more personalized document representations 530 than would be generated absent such personalization features of the system. The semantic networks 528, 548, etc., are engaged in a feedback loop. Human-machine collaboration is intended to make each successive output representation 530 of the document 524 content a better reading experience for the user. Such human-machine collaboration is facilitated by the construction by the system of semantic networks 528, 548, etc., and connections there between, given that semantic networks 528, 548, etc., are both human and machine understandable (i.e. can be processed by the system to produce system outputs). The document semantic network 528 created on the basis of the document 524 is available for connection with other semantic networks such as the personal semantic network 548. The system in at least some embodiments is operable to execute graph theoretic algorithms to connect and provides weights to the elements of a document 524 so as to advantageously indicate those elements of importance to the user.

The present invention advantageously enhances the user reading experience. The methods and system of the present invention are particularly suitable for enhancing reading experiences related to knowledge acquisition and expansion, where knowledge acquisition and expansion pertains to personal knowledge acquisition and expansion of a user.

Given the volume and form of information today, reading experiences are facilitated by machine intelligence and human-machine collaboration in accordance with the present invention. The system in accordance with the present invention is operable to automatically annotate document 524 content, such as by generating digital representations of syntax trees 506 (FIG. 16); make determinations of conceptual importance and/or relevance to a given user input (e.g. topic) and/or relevance to a given output (e.g. output representation 530); determining concept similarity as between concepts; clustering concepts to facilitate navigation (i.e. locating and processing subsets of a plurality of concepts); recording document 524 facts and other operations. The system in accordance with the present invention is advantageously operable to supplement human working memory. Because they are both human and machine understandable, semantic networks (523, 548) are a beneficial medium of exchange between humans and the system of the present invention. For example, personal semantic networks 548 are stored and aggregated over time as the user makes use of such personal semantic networks 548. The expansion of personal semantic networks advantageously supplements a user's working memory, thereby advantageously facilitating a user's use of many documents while minimizing or eliminating fatigue caused by information overload.

Figure 19:
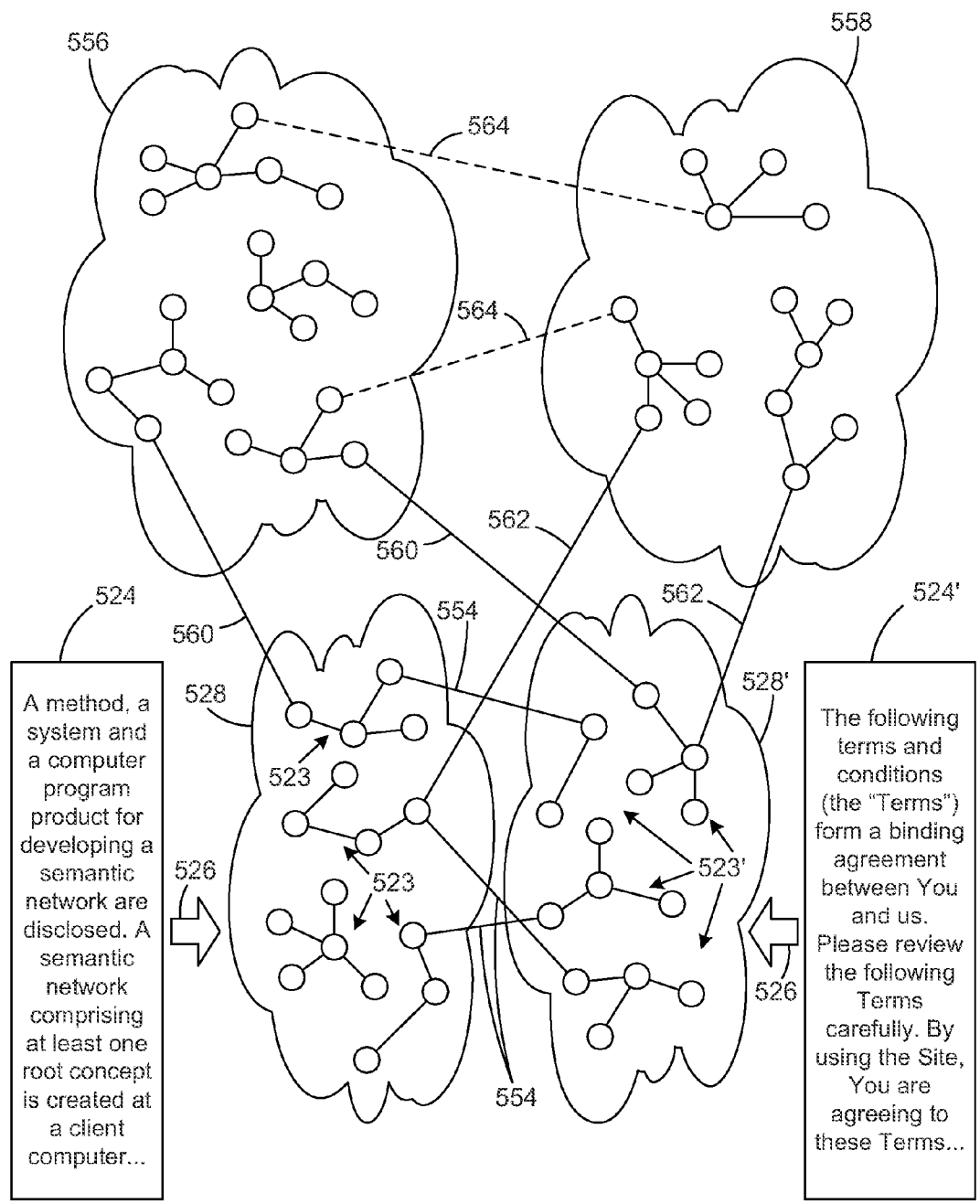
FIG. 19 shows a plurality of document semantic networks, a plurality of personal semantic networks, and connections there between produced by the system of the present invention.

FIG. 19 illustrates further embodiments of the present invention and depicts how first principles of the present invention can be applied to multiple number of documents, each of which may be associated with user input received from any number of users. The functionality of the system described and illustrated herein applies equally to a set of multiple documents 524, 524', etc., and is not constrained to just one document 524. A user, therefore, can view many different documents 524, 524', etc., in many different output representations 530, thereby providing reading experiences across a span of documents 524, 524', etc., which are aggregative by recording user input and executed output representations 530. The system is preferably operable to perform such recording.

Still referring to FIG. 19, as also described herein in respect of previous figures, unstructured text from documents 524 and 524' are converted to sets 528 and 528' of semantic networks 523 and 523' using the method 526, respectively. The method 526 in at least some embodiments involves performing natural language processing and executing conceptualization techniques. The system of the present invention is operable in at least some embodiments to create semantic relationships 554 between zero or more semantic networks 523 and zero or more semantic networks 523' by executing steps of a method (not shown in FIG. 19), which may be identical, similar, analogous or different to the methods of conceptualization and semantic similarity by which semantic relations can be sought for and found among the semantic networks 523 and/or among the semantic networks 523'. In at least some embodiments, the execution of such method steps to create semantic relations between the semantic networks 523 and the semantic networks 523' has the effect of merging the availability to the system of content from both documents 524 and 524'.

User experiences associated with various document 524 and 524' output representations 530 (not shown in FIG. 19) allows for the acquisition and expansion of personal knowledge, which is indicated in FIG. 19 as having been generated by the system of the present invention in the form of a first personal semantic network 556 associated with a first user and a second personal semantic network 558 associated with a second user different from the first user. (In general, the first and second users may represent any human or group thereof, including representing the same human having a plurality of user identifications. The system is preferably operable to produce any number of personal semantic networks 556, 558, etc.)

By way of example and with reference to FIG. 19, the personal semantic network 556, created by the system in response to user input received from a user X, connects via the connections 560 to the document semantic networks 528 and 528' produced from documents 524 and 524', respectively, by executing steps 526. In like manner, the personal semantic network 558, created by the system in response to user input received from a user Y, connects via the connections 562 to the document semantic networks 524 and 524'. The system is operable to permit users X and Y to use their own semantic networks to personalize their respective reading experiences, which advantageously facilitates users X and Y in acquiring and expanding their own knowledge from shared resources (i.e. documents 524 and 524').

The system is further operable in at least some embodiments to create connections 564 between the personal semantic networks 556 and 558. The connections 564 provide access to another user's input to the system. This feature of capturing and storing reading experiences and creating connections 564 between personal semantic networks of different users means that reading experiences, such as in the form of personal semantic networks expressing user input, can be distributed and shared with other people. Hence, one user's interaction with a given document's content is capable of improving the reading experience for other users. By way of example, the system in some embodiments is operable to dynamically generate a text summary 536 (FIG. 17) of a given document produced in response to user input received from a first user and present such text summary 536 to a second user, different from the first user, without having to provide the second user with access to the given document. In this example, the second user may submit user input indicative of a request for a text summary 536 biased or filtered by the first user (e.g. "User X summary filter on Document A").

Referring to FIG. 20, the facts listing 534 type of document representation 530 (FIG. 17) includes the list of facts 566, ordered by weight of importance 568. The system is operable to compute these weights 568 by a graph-theoretic algorithm based on the document semantic network 528 (FIG. 18). The facts listings 534 includes an input box 570 labeled "Search:" in FIG. 18, into which the user is permitted to enter text 572. The search text 572 is received by the system as user input, and the system is operable to search and filter facts in response to the search text 572. The system is also operable to record data associated with a given search as part of the recording of the user experience by generating and/or modifying an associated personal semantic network (e.g. the personal semantic network 548 of FIG. 18).

The system is operable to permit a user to select a particular fact 574 for displaying drill down text 576 of the original document 524 associated with the particular user selected fact 574. Preferably, the drill down text 576 includes the user selected fact 574, which may be highlighted for example, and original document 524 text appearing immediately before and after the user selected fact 574. The operation of receiving user input selecting the user selected fact 574 is recorded by the system for generating and/or modifying the personal semantic network 548. In some embodiments, the system is also operable to include hyperlinked text 578 within the drill down text 576. The system is operable to permit a user to select a hyperlink of the hyperlinked text 578, and provide in response thereto a new set of facts 566 (not shown).

When the system is conducting a search on the basis of the search text 572, the system is operable to conducting the search on a plurality of documents, such as searching a corpus of documents based on the contents in the input box 570, thereby producing a subset of documents having relevance to the search text 572. Such produced subset of documents forms part of the system's record capturing user interaction with the system in respect of the facts listings 534. In some embodiments, the selection of documents 524 to be included in a given search is user controllable.

In some embodiments, the system is operable to permit the user to edit the weights 568 directly, thereby advantageously capturing further information regarding the user interaction with the system for generating and/or modifying the user's personal semantic network 548. In some embodiments, the system is operable to comment (not shown) directly on facts 566, such as by providing information regarding the user's subjective assessment of the relevance and/or veracity of a given fact 566. The system is operable in such embodiments to generate and/or modify the user's personal semantic network 548 on the basis of such comments.

Referring to FIG. 21, the text summary 536 type of document representation 530 (FIG. 17) includes a summary 580 produced by the system of the document 524. The system is receive as user input a request for a summary 580 of the document 524. Upon receiving such request, the system is operable to produce the requested summary 580 based on graph-theoretic algorithms operating on the document semantic network 528 related to the document 524. Preferably, the system is operable to produce the requested summary 580 also on the basis of the personal semantic network 548 (FIG. 18) of the user who requested the summary 580. Based on the document semantic network 528, and the personal semantic network 548 if any, the system is operable to determine the most important to lesser important concepts to be referenced in the summary 580, even in the absence of further user input.

The system, however, is operable to receive further user input upon which to base the generation of the requested summary 580. By way of example, the system is operable to provide the input box 570 and to permit the user to specify a topic of interest by specifying the search text 572. As shown in FIG. 21, the exemplary topic of interest specified by the search text 572 is "Cassini probe". The system is further operable to provide a strictness check box 582. When the strictness check box 582 is checked, the system is operable to produce the requested summary 580 such that the requested summary 580 includes only sentences of the document 524 which include the search text 572 (e.g. Cassini probe). In the exemplary summary 580 of FIG. 21, the strictness check box 582 is not checked, thus the summary 580 may include sentences which do not include the term "Cassini probe".

The text summary 536 type output representation includes a slidebar 584, which permits the user to specify how much information should be included in the summary 580, such as by permitting the user to specify the number of sentences to be included in the summary 580. Different summary sizes imply different summary types: indicative (few sentences) versus informative (many sentences). The system is operable to produce the summary 580 such that the summary 580 includes the number of sentences specified by the user in accordance with the user's placement of the slidebar 584, and to dynamically adjust the presentation of the summary in response to changes of the slidebar 584 setting.

The system is operable to include hyperlinked text 578 in the summary 580. The hyperlinked text 578 is generated by the system on the basis of the document semantic network 528. The system is operable to permit a user to select an instance of hyperlinked text 578 within a summary, and to produce in response thereto a new summary. For example, the system may receive the hyperlinked text 578 as search text 572. The system is operable to generate and/or modify the user's personal semantic network 548 in response to capturing the user input on which various summaries 580 are produced, the various summaries 580 produced, the types of summaries 580 (e.g. indicative versus informative), or any combination thereof for example.

Recording information for generating and/or modifying the personal semantic network 548 advantageously facilitates the determination by the system of summaries 580 not produced by the system. In at least some embodiments, producing the hyperlinked text 578 by the system involves determining identifications of significant concepts. If the user does not select hyperlinked text 578 included in an output representation 530 such as a summary 580, including possibly repeatedly not selecting a given hyperlinked text 578 included in multiple output representations 530 of the same or different types, the system is operable to reduce a significance weight (not shown in FIG. 21) associated with the given hyperlinked text 578.

The system is operable to search within a corpus of documents 524 using as search criteria a topic of interest previously used for producing a summary 580, thereby producing a subset of documents 524 on the basis of the topic of interest. The system is operable to record data related to the topic of interest and the produced subset of documents 524, and to generate and/or modify the user's personal semantic network on the basis thereof.

In some embodiments, the system is operable to permit a user to rate (not shown) a summary 580 and to add user notes (not shown) relating to a summary 580.

Figure 22:
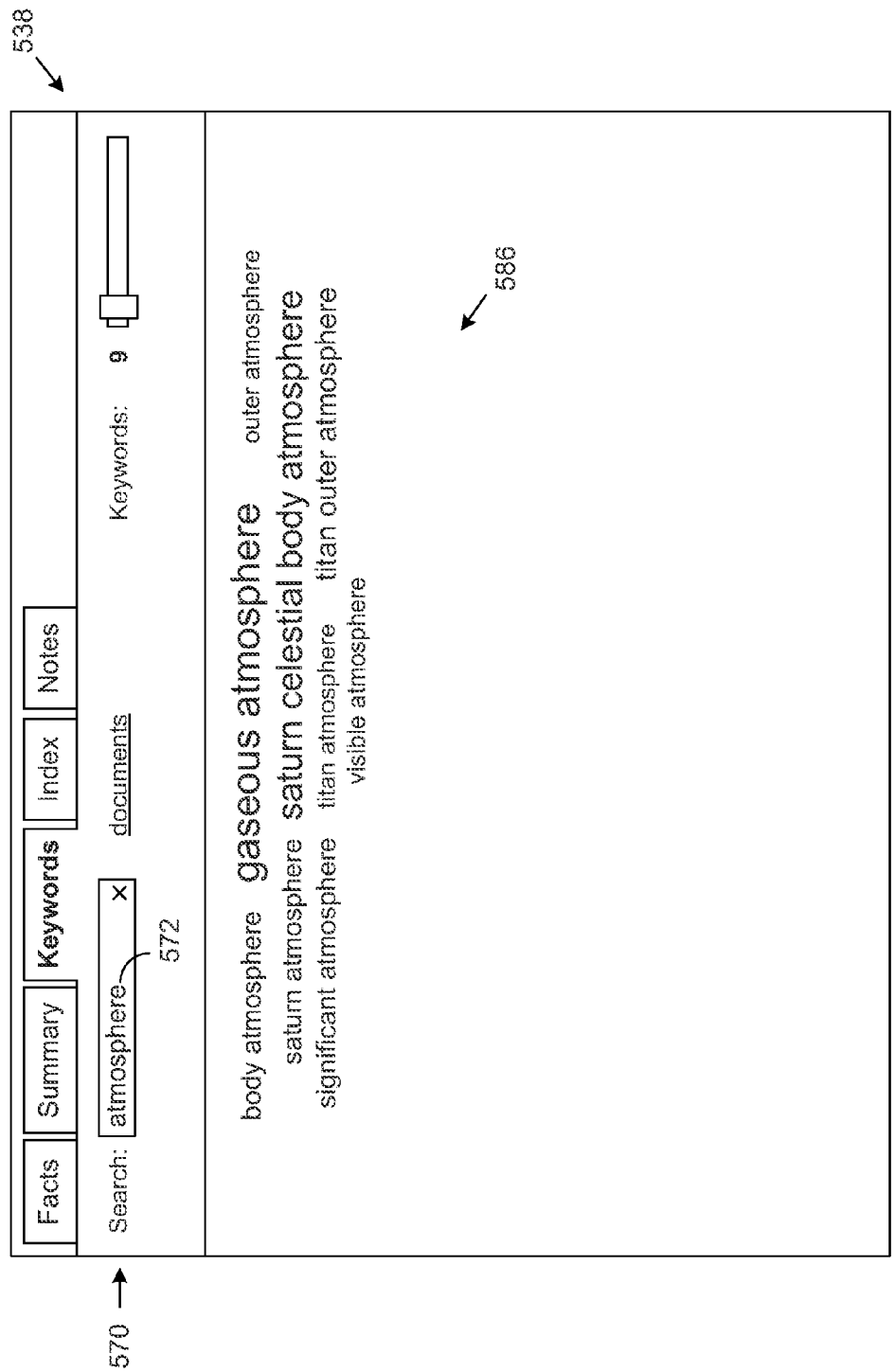
FIG. 22 shows an exemplary Keywords tag cloud type output representation produced by the system.

Referring to FIG. 22, the tag cloud 538 type of document representation 530 (FIG. 17) includes a set of one or more keywords 586 associated with a document 524. The keywords 586 represent the concept space of the document 524. The tag cloud 538 output representation includes the slidebar 584. The system is operable to produce the set of keywords 586 such that the set of keywords 586 has a volume indicated by the user placement of the slidebar 584, such as by having the number of keywords specified by the user placement of the slidebar 584. A keyword 586 may include any number of words, although typically each keyword 586 consists of 1 to 5 words. The system is operable to determine a significance weight (not shown in FIG. 22) for each keyword 586 by executing graph-theoretic algorithm operating on the semantic relations of a document semantic network 528. The system is operable to indicate the determined significance weight of each keyword 586 in the displayed tag cloud 538 by font color (not shown in FIG. 22) and font size (shown in FIG. 22) of the displayed keyword 586.

The system is operable to receive search text 572 entered by the user into the input box 570, to conduct a search of keywords 586 associated with the given document 524 or corpus of documents 524 on the basis of the user entered search text 572, and to produce the tag cloud 538 such that keywords located by the search are included in the tag cloud 538. In the exemplary tag cloud 538 shown in FIG. 22, the exemplary search text 572 is the word "atmosphere".

The system is operable to permit a user to select a keyword 586 of the produced tag cloud 538, and to produce in response to such user selection a list of facts 566 (FIG. 20) associated with the selected keyword 586. Thus, the system is operable to cause interaction between output representations 530.

Referring to FIGS. 20-22, the system is operable to permit a user to select the "documents" hyperlink 588, and in response thereto conduct a search of a set of documents 524 on the basis of the search text 572.

The system is operable to record user input, output representations 530 and document 524 searches, and to generate and/or modify a user's personal semantic network 548 in response thereto.

In some embodiments, the system is operable to permit the user to add keywords 586. In some embodiments, the system is operable to permit the user to modify the value of significance weights previously determined by the system.

Figure 23:
FIG. 23 shows an exemplary Index type output representation produced by the system.

Referring to FIG. 23, the index 540 type of document representation 530 (FIG. 17) includes index entries 590 of a back-of-the-book style index associated with the document 524. The system is operable to derive the index entries 590 from the semantic relations of a document semantic network 528 associated with a document 524. The system is operable to permit a user to place the slidebar 584 setting, and to determine the number and detail of the index entries 590 in response to the slidebar 584 setting.

The system is operable to make the text and/or referencing numbers of the index entries 590 selectable by the user. The system is operable to receive such user selections and to produce further output representations 530 in response to such user selections. The system is operable to generate and/or modify the user's personal semantic network 548 in response to data captured when receiving user selections. For example, the system is operable to receive a selection of the text of a given index entry 590, and to produce in response thereto a facts listing 534 which includes facts 566 associated with the selected text of the given index entry 590. Such facts listing 534 shows any number of facts 566 listed in order from facts having highest weight values to those having lower weight values. The system is further operable to permit a user to select a given fact 566, and to produce in response thereto a further list of facts 566 in which the further listed facts 566 are displayed in order of appearance of such further listed facts 566 within the original document 524.

Referring to FIG. 24, the annotated text 542 type of document representation 530 (FIG. 17) includes a representation 592 of the original document 524, which may or may not be presented to the user in the original presentation style. The annotated text 542 type output representation 530 also includes one or more annotations 594 associated with a selection 596 of text of the original document 524. Each selection 596 may comprise one or more sentences, for example. As shown in FIG. 24, the annotation 594 may be presented to the user as a dialog box, such as a mouseover dialog box for example. In variations of embodiments, the annotation 594 may be presented in the form of mouseovers of highlighted text, text highlighting, margin-placed text, footnote, header, etc., and any combination thereof for example.

The system is operable to produce each annotation 594 on the basis of the document semantic network 548 in response to the user selection 596. Annotations 594 preferably include general information on the selection 596; facts, such as the facts 566, associated with the selection 596; and keywords, such as the keywords 586, associated with the selection 596. In some embodiments at least the system is operable to permit the user to add comments and to store such comments in association with the selection 596 and related annotation 594; permit the user to provide a weight 598 for association with an annotated selection 596; and permit the user to modify facts, such as facts 566 derived by the system from the selection 596. In some embodiments, the system is operable to permit the user to create facts, and the system is operable to receive such facts as user input.

The system is operable to record the user selections 596, and to generate and/or modify the user's personal semantic network 548 in response thereto. In response to recorded user input, the system is operable in some embodiments to modify and/or compute new values of significance weights for associating with facts 566, RDF elements 519 (FIG. 16), etc., including modifying and/or computing new values of significance weights by executing graph-theoretic algorithms for example.

In the present invention, the system is operable to store accreditations to original sources in association with at least some and preferably every element of a semantic network. Hence, some semantic networks or the subset thereof, may or may not be accessible to one or more users other than the originator of the semantic network. Access to a semantic network depends on sharing privileges being granted by the owner or originator of a semantic network. A semantic network is internal to the user when it belongs to the user and is not shared. A semantic network is external to a user when the user is not the owner but is granted sharing privileges. The system is operable to receive user input setting sharing privileges in respect of a user's own personal semantic networks and to grant sharing privileges to other users in response to such user input.

The present invention encompasses providing some or all of the features described and/or illustrated herein in the form of one or more standalone, executable program modules. Such modules are in some embodiments suitable for embedding within any embedded object technology platform including, but not restricted to, document software platforms and web platforms. For example, the step 526 (FIGS. 17-19) of transforming a document 524 into a set 528 of semantic networks 523 may be provided as a standalone, executable program module, including in some embodiments as a standalone, executable program module for execution at a client computer.

Thus, there is provided a method of generating a document representation. The method includes: receiving into a memory of a system a resource containing at least one sentence of text information, the system comprising a server and a client computer; producing in response to each of the at least one sentence a system-storable tree comprising a plurality of tree elements and grammatical relations between the tree elements, each of the tree elements indicating a part-of-speech contained within the each sentence; producing in response to each of the trees one or more semantic structures such that each of the semantic structures may include three the tree elements selected by the system such that the each semantic structure represents a simple clause associated with the each tree; and storing in the memory the one or more semantic structures in association with one or more connections between common ones of the tree elements, thereby generating a set of one or more semantic networks representing the resource.

While embodiments of the invention have been described and illustrated, such embodiments should be considered illustrative of the invention only. The invention may include variants not described or illustrated herein in detail. For example, further computer program product codes may be employed to collate document use histories and generate further statistical data therefrom. Thus, the embodiments described and illustrated herein should not be considered to limit the invention as construed in accordance with the accompanying claims.

What is claimed is:

1. A non-transitory computer-readable medium comprising computer program code for controlling one or more processors of a client computer to carry out the following steps:
creating a semantic network containing at least one root concept;

performing a set of instructions associated with the semantic network, the set of instructions comprising:
    transmitting information about the semantic network from the client computer to a server;
    providing information about at least one resource to the server;
    receiving information about a modified semantic network from the server, the modified semantic network being an updated version of the semantic network having been updated based on the information about the at least one resource;
    presenting the information about the modified semantic network to a user;
    receiving a response from the user, the response including a numeric weight representative of a conceptual unattractiveness value indicating the user's preferred direction for modifying the modified semantic network; and
    based on the response, further modifying the modified semantic network.

2. The non-transitory computer readable medium of claim 1, wherein the at least one root concept is a user-selected topic mark from an existing semantic network, the existing semantic network being previously created and stored in the server.

3. The non-transitory computer readable medium of claim 1, wherein providing information about at least one resource to the server comprises:
    querying a user for the at least one resource;
    receiving a response from the user about the at least one resource; and
    based on the response, transmitting information about the at least one resource from the client computer to the server.

4. The non-transitory computer-readable medium of claim 3, further comprising:
    carrying out, in response to receiving a null response from the user about the at least one resource, an automated search in a set of resources available via a wide-area network;
    rating results of the search for their relevance;
    presenting the user with the rated results; and
    querying the user for a selection from the rated results.

5. The non-transitory computer-readable medium of claim 1, comprising code for creating a data structure comprising concepts, relations between the concepts, and concept/relation metadata.

6. The non-transitory computer-readable medium of claim 1, further comprising code for creating concept/relation metadata that comprise at least one of:
    a numeric weight associated with each concept;
    a comment associated with at least one concept or at least one relation;
    a tag for annotating the at least one concept;
    an identifier for the tag;
    a numeric weight associated with the tag;
    a source indication of each concept;
    an identifier for each concept or relation;
    a timestamp for each concept or relation; and
    a concept similarity directive.

7. The non-transitory computer-readable medium of claim 1, further comprising code for creating concept/relation metadata that comprise a numeric weight associated with each concept, a source indication of each concept, an identifier for each concept or relation, a timestamp for each concept or relation, and a concept similarity directive.

8. The non-transitory computer-readable medium of claim 1, further comprising code for creating concept/relation metadata that comprise a tag for annotating at least one concept, an identifier for the tag, and a numeric weight associated with the tag.

9. The non-transitory computer-readable medium of claim 1, further comprising code for creating a resource structure for the at least one resource, the resource structure comprising:
    a unique identifier; and
    resource metadata associated with the resource.

10. The non-transitory computer-readable medium of claim 9, wherein the resource metadata comprises at least one of:
    a source indication of the resource;
    a reference to all or part of the resource;
    a resource title;
    a numeric weight associated with the resource;
    an identifier for the resource; and
    a timestamp for the resource.

11. The non-transitory computer-readable medium of claim 9, wherein the resource metadata comprises a reference to all or part of the resource and a numeric weight associated with the resource.

12. The non-transitory computer-readable medium of claim 9, wherein the resource metadata comprises a source indication of the resource, a reference to all or part of the resource, a numeric weight associated with the resource, and a timestamp for the resource.

13. The non-transitory computer-readable medium of claim 1, further comprising code for providing control parameters to the server, the control parameters comprising at least one of:
    a limit on new connections to be contained in the modified semantic network;
    a limit on a depth of new connections to be contained in the modified semantic network;
    a concept similarity threshold to be applied in processing semantic structures;
    a limit on a number of new resources from which semantic structures are to be extracted; and
    an absolute limit on the maximum depth of relations in the modified semantic network.

14. The non-transitory computer-readable medium of claim 1, further comprising code for providing control parameters to the server, the control parameters comprising a limit on new connections to be contained in the modified semantic network, a limit on a depth of new connections to be contained in the modified semantic network, and an absolute limit on the maximum depth of relations in the modified semantic network.

15. The non-transitory computer-readable medium of claim 1, further comprising code for providing control parameters to the server, the control parameters comprising a concept similarity threshold to be applied in processing semantic structures, an absolute limit on the maximum depth of relations in the modified semantic network, and a limit on a number of new resources from which semantic structures are to be extracted.

16. The non-transitory computer-readable medium of claim 1, wherein the code implements a plug-in for a web browser.

17. A non-transitory computer-readable medium comprising computer program code for controlling one or more processors of a server to carry out the following steps:
    receiving information about a semantic network comprising at least one root concept from a client computer;
    determining at least one resource based on the information about the semantic network by carrying out an automated search in a set of resources available via a wide-area network and receiving results from the automated search;
extracting semantic structures from the at least one resource;
processing the semantic structures for determining a measure of significance for the semantic network;
modifying the semantic network, based on the processed semantic structures; and
transmitting information about the modified semantic network to the client computer.

18. The non-transitory computer-readable medium of claim 17, wherein processing the semantic structures comprises:
sending at least one query from the server computer to a knowledge source;
receiving at least one response from the knowledge source by the server computer; and
rating the semantic structures for the measure of significance based on the response.

19. The non-transitory computer-readable medium of claim 18, wherein the knowledge source comprises at least one of:
an ontology;
a database;
a knowledgebase; and
services, brokers and agents accessible through a wide-area network.

20. The non-transitory computer-readable medium of claim 1 further comprising the server non-transitory computer-readable medium of claim 17.

21. A system for developing a semantic network, the system comprising a client computer and a server,
the client computer comprising:
a component configured to create a semantic network comprising at least one root concept;
a component configured to transmit information about the semantic network from the client computer to the server computer;
a component configured to provide information about at least one resource to the server computer;
a component configured to provide, to the server computer, control parameters including a limit on new connections to be contained in a modified semantic network;
a component configured to receive information about the modified semantic network from the server computer;
a component configured to present the information about the modified semantic network to a user;
a component configured to receive a response from the user;
a component configured to further modify the modified semantic network based on the response;
a component configured to receive commands from the user on whether to repeat modification of the semantic network;
the server comprising:
a component configured to receive information about a semantic network comprising at least one root concept from the client computer;
a component configured to receive information about at least one resource from the client computer;
a component configured to extract semantic structures from the at least one resource;
a component configured to process the semantic structures, for determining a measure of significance for the semantic network;
a component configured to modify the semantic network, based on the processed semantic structures; and
a component configured to transmit information about the modified semantic network to the client computer.

22. The system of claim 21, wherein the server comprises a plurality of server computers configured to extract the semantic structures from the at least one resource and to process the semantic structures.

23. A method for developing a semantic network, the method comprising:
receiving into a memory of a system a user's input,
the user's input comprising:
a semantic network containing a root concept; and
a list of one or more resources associated with the root concept;
the system comprising:
a server; and
a client computer;
providing to the user, in response to the user's input, a set of one or more concept-relation-concept (CRC) triples;
receiving from the user a response associated with the set of one or more CRC triples, the response including a numeric weight for one or more concepts in the set of one or more CRC triples, the numeric weight representative of a conceptual unattractiveness value indicating the user's preferred direction for modifying the semantic network;
modifying the semantic network based on the response; and
repeating modification of the semantic network according to commands from the user, wherein modification is repeated until all possible CRC triples have been provided based on the list of one or more resources.

24. The method of claim 23, wherein providing to the user, in response to the user's input, a set of one or more concept-relation-concept (CRC) triples comprises:
determining a semantic similarity between concepts associated with different CRC triples within the set of one or more CRC triples;
producing one or more connections between the concepts having sufficient the semantic similarity; and
presenting to the user the set of one or more CRC triples and associated the one or more connections, thereby generating an expanded semantic network associated with the user's input.

25. The method of claim 23, further comprising providing tags and/or terms for each concept in the set of one or more CRC triples.

26. The method of claim 24, wherein determining a semantic similarity comprises:
selecting at least two concepts from the set of one or more CRC triples, each of the at least two concepts being from a different CRC triple;
associating concept/relation metadata with the at least two concepts;
determining a probability of similarity based on the concept/relation metadata associated with the at least two concepts;
determining whether the probability of similarity is equal to or greater than a threshold, the threshold being set by the user; and
creating at least one connection between the at least two concepts if the probability of similarity is equal to or greater than the threshold.

27. The method of claim 26, wherein the concept/relation metadata comprises a concept similarity directive.

28. The method of claim 23, wherein the response further includes:
a removal request for one or more concepts in the set of one or more CRC triples, the removal request indicative of the user's preferred direction for modifying the semantic network.

29. The method of claim 23, wherein modifying the semantic network based on the response comprises:
updating the set of one or more CRC triples with new CRC triples according to the response; and
providing to the user an updated set of one or more CRC triples,
wherein modifying the semantic network based on the response is repeated until all possible new CRC triples have been provided based on the list of one or more resources.

30. A method, performed by a system comprising a server and a client computer, for developing a personal semantic network, the method comprising:
producing a set of one or more document semantic networks associated with a document in response to natural language sentences within the document;
receiving, into a memory of the system, input commands from a user for generating one or more document output representations by utilizing the set of one or more document semantic networks associated with the document;
producing a set of one or more semantic statements in response to the input commands associated with the one or more document output representations;
generating a personal semantic network comprising one or more semantic relationships between the set of one or more semantic statements and the set of one or more document semantic networks, wherein the one or more semantic relationships are determined by a semantic similarity between the one or more semantic statements and the one or more document semantic networks;
storing into the memory of the system a document use history comprising the input commands received in association with the one or more document output representations; and
modifying the personal semantic network in response to the document use history.

31. The method of claim 30, wherein the personal semantic network is accessible to one or more additional users depending on sharing privileges granted by the user.

32. The method of claim 30, further comprising:
generating a first personal semantic network associated with a first user;
generating a second personal semantic network associated with a second user;
establishing one or more connections between the first personal semantic network and the second personal semantic network, wherein the one or more connections are determined by the semantic similarity between the first personal semantic network and the second personal semantic network; and
producing a personal output representation of a given document based on the one or more connections, thereby enabling sharing of information associated with the given document between the first user and the second user.

33. The method of claim 32, wherein producing a personal output representation based on the one or more connections comprises:
generating the personal output representation for the first user based on the first user's input commands for generation of a given representation associated with the given document; and
presenting to the second user the personal output representation in response to the second user's request, thereby enabling information sharing without having to allow the second user access to the given document.

* * * * *